United States Patent
Takahashi

(10) Patent No.: US 10,182,167 B2
(45) Date of Patent: Jan. 15, 2019

(54) APPARATUS AND METHOD FOR OBTAINING UPDATE INFORMATION VIA A NETWORK TO DISPLAY DATA

(71) Applicant: Satoshi Takahashi, Kanagawa (JP)

(72) Inventor: Satoshi Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/557,978

(22) PCT Filed: Apr. 22, 2016

(86) PCT No.: PCT/JP2016/002153
§ 371 (c)(1),
(2) Date: Sep. 13, 2017

(87) PCT Pub. No.: WO2016/181621
PCT Pub. Date: Nov. 17, 2016

(65) Prior Publication Data
US 2018/0041650 A1 Feb. 8, 2018

(30) Foreign Application Priority Data
May 14, 2015 (JP) ................... 2015-099239

(51) Int. Cl.
*G06F 3/12* (2006.01)
*H04N 1/00* (2006.01)
(Continued)

(52) U.S. Cl.
CPC ..... *H04N 1/00506* (2013.01); *G03G 15/5016* (2013.01); *G06F 3/121* (2013.01);
(Continued)

(58) Field of Classification Search
None
See application file for complete search history.

(56) References Cited

U.S. PATENT DOCUMENTS

| 5,057,866 | A | 10/1991 | Hill, Jr. et al. |
| 6,266,693 | B1 | 7/2001 | Onaga |

(Continued)

FOREIGN PATENT DOCUMENTS

| DE | 10050588 | 7/2001 |
| EP | 2602987 | 6/2013 |

(Continued)

OTHER PUBLICATIONS

International Search Report dated Jul. 5, 2016 in PCT/JP2016/002153 filed on Apr. 22, 2016.

(Continued)

*Primary Examiner* — Dung D Tran
(74) *Attorney, Agent, or Firm* — IPUSA, PLLC

(57) ABSTRACT

An apparatus includes a display that displays data; a memory that stores the data and a display condition for displaying the data; and a processor. The processor determines whether the display condition is satisfied in accordance with a change of status of the apparatus. The processor displays the data in response to determining that the display condition is satisfied. The processor obtains, via a network at a timing represented by information that is stored in association with the data, update information to update the at least one of the data and the display condition stored in the memory. The update information obtained via the network includes information indicative of a next update time. The processor obtains, based on the next update time, next update information via the network.

18 Claims, 20 Drawing Sheets

(51) Int. Cl.
*G03G 15/00* (2006.01)
*G06K 15/02* (2006.01)

(52) U.S. Cl.
CPC ....... *G06F 3/1229* (2013.01); *G06K 15/1805* (2013.01); *H04N 1/00037* (2013.01); *H04N 1/00076* (2013.01); *H04N 2201/0094* (2013.01)

(56) References Cited

U.S. PATENT DOCUMENTS

| | | | |
|---|---|---|---|
| 6,285,835 B1 | 9/2001 | Guillemin et al. | |
| 7,483,159 B2* | 1/2009 | Tokutomo | B41J 2/17533 358/1.13 |
| 7,729,622 B2* | 6/2010 | Yamanaka | G03G 15/502 399/8 |
| 7,853,167 B2* | 12/2010 | Sasaki | G03G 15/0856 399/107 |
| 9,224,081 B2* | 12/2015 | Xu | H04N 1/00832 |
| 9,298,156 B2* | 3/2016 | Fukuoka | G03G 15/502 |
| 2002/0054340 A1* | 5/2002 | Tokutomi | B41J 2/17533 358/1.15 |
| 2006/0039707 A1* | 2/2006 | Mima | B41J 2/17546 399/23 |
| 2008/0124096 A1* | 5/2008 | Wada | G03G 15/55 399/24 |
| 2009/0040251 A1* | 2/2009 | Motominami | B41J 2/1752 347/7 |
| 2010/0107150 A1* | 4/2010 | Kamada | G06F 8/65 717/170 |
| 2014/0115172 A1* | 4/2014 | Agata | H04L 65/1069 709/227 |
| 2014/0149894 A1* | 5/2014 | Watanabe | G06F 3/0481 715/761 |
| 2014/0160509 A1* | 6/2014 | Kondo | H04N 1/00899 358/1.13 |
| 2016/0255221 A1* | 9/2016 | Takahashi | H04N 1/00477 358/1.15 |

FOREIGN PATENT DOCUMENTS

| | | |
|---|---|---|
| JP | H07-146831 | 6/1995 |
| JP | 2007-148885 | 6/2007 |
| JP | 2013-117864 | 6/2013 |
| JP | 2014-179038 | 9/2014 |

OTHER PUBLICATIONS

Extended European Search Report for 16792351.5 dated May 3, 2018.

* cited by examiner

[Fig. 1]
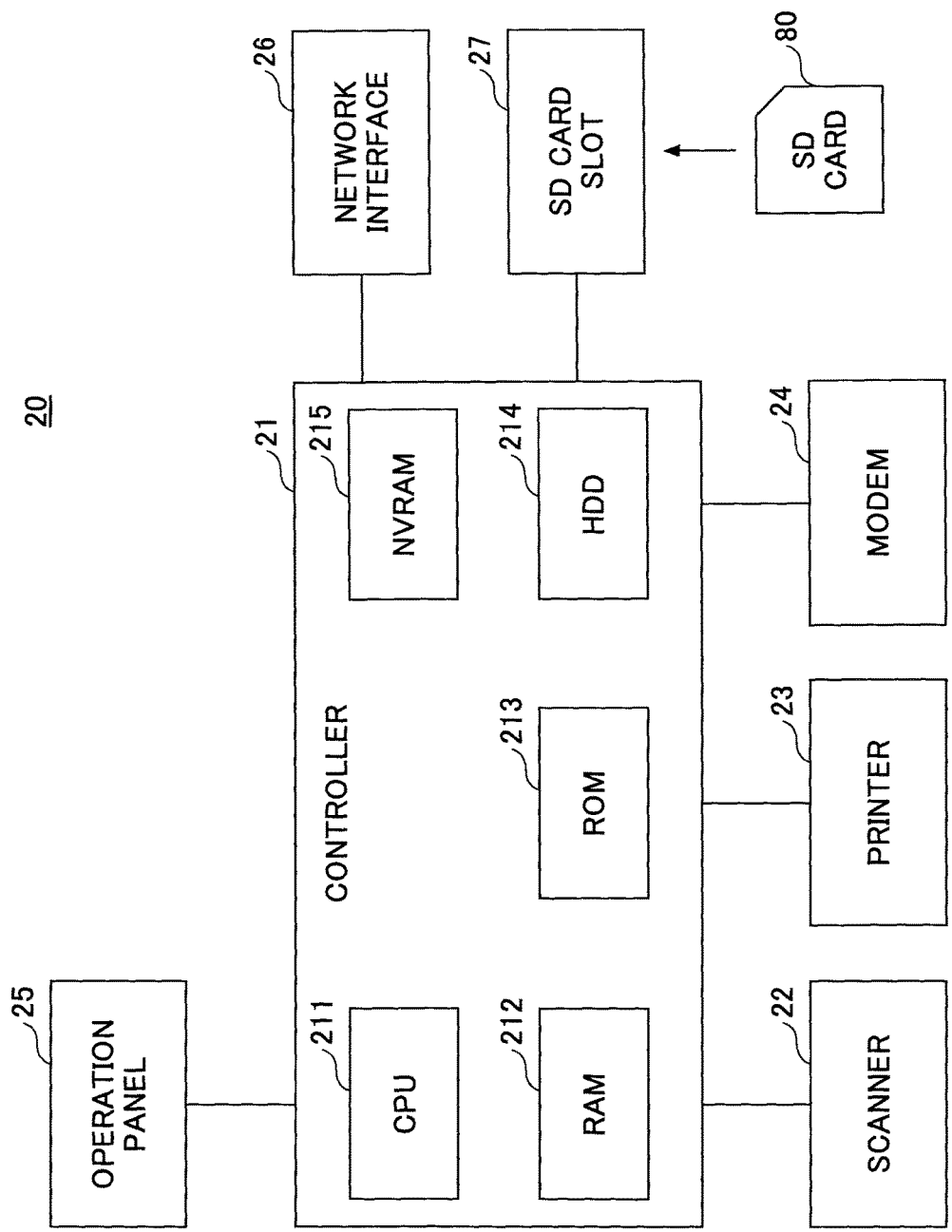

[Fig. 2]
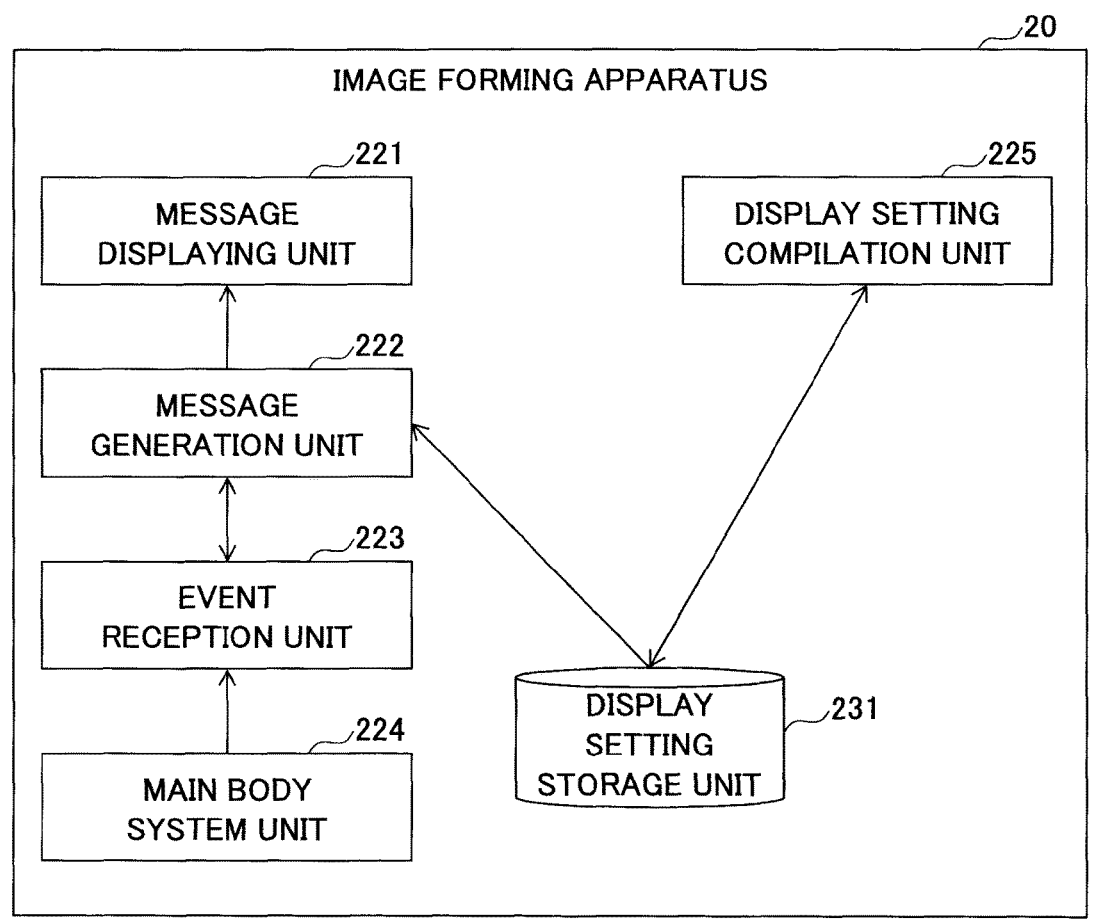

[Fig. 3]
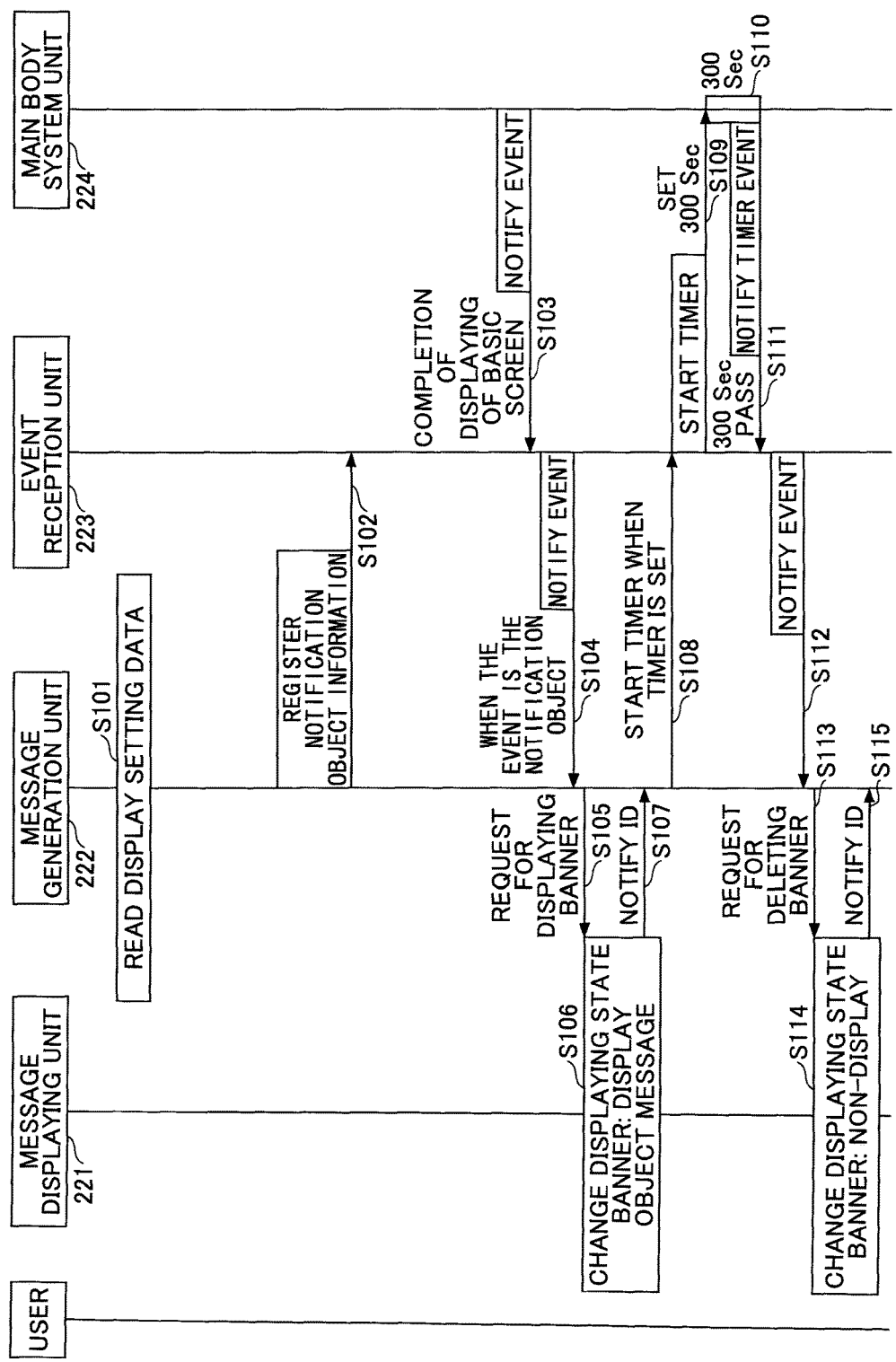

[Fig. 4]

| SETTING NAME | DISPLAY TRIGGER EVENT | DELETE TRIGGER EVENT | DISPLAY PATTERN | DISPLAY CLASSIFICATION | DISPLAY CONTENT |
|---|---|---|---|---|---|
| WHEN STARTING | COMPLETION OF DISPLAYING OF BASIC SCREEN | TIMER (300 Sec) | BANNER | CHARACTER STRING | CONTACT ○○ STORE WHEN MALFUNCTION OCCUR |
| WHEN STARTING COPY | JOB EXECUTION (COPY) | JOB END (COPY) | WIDGET | IMAGE | Commercial.jpg |
| TONER NEAR END | TONER NEAR END | CANCEL OF TONER NEAR END | BANNER AND WIDGET | IMAGE + CHARACTER STRING | Toner.jpg<br>CONTACT ○○ STORE WHEN BUYING TONER<br>TEL: 00-xxxx-yyyy |
| PAPER RUN OUT | PAPER RUN OUT EVENT | CANCEL OF PAPER RUN OUT | BANNER AND WIDGET | IMAGE + CHARACTER STRING | ARE PAPERS STOCKED?<br>CONTACT ○○ STORE<br>http://ooo.jp/cgi-bin?order |

[Fig. 5]

| SETTING NAME | DISPLAY TRIGGER EVENT | DELETE TRIGGER EVENT |
|---|---|---|
| WHEN STARTING | COMPLETION OF DISPLAYING OF BASIC SCREEN | TIMER (300 Sec) |
| WHEN STARTING COPY | JOB EXECUTION (COPY) | JOB END (COPY) |
| TONER NEAR END | TONER NEAR END | CANCEL OF TONER NEAR END |
| PAPER RUN OUT | PAPER RUN OUT EVENT | CANCEL OF PAPER RUN OUT |

[Fig. 6]
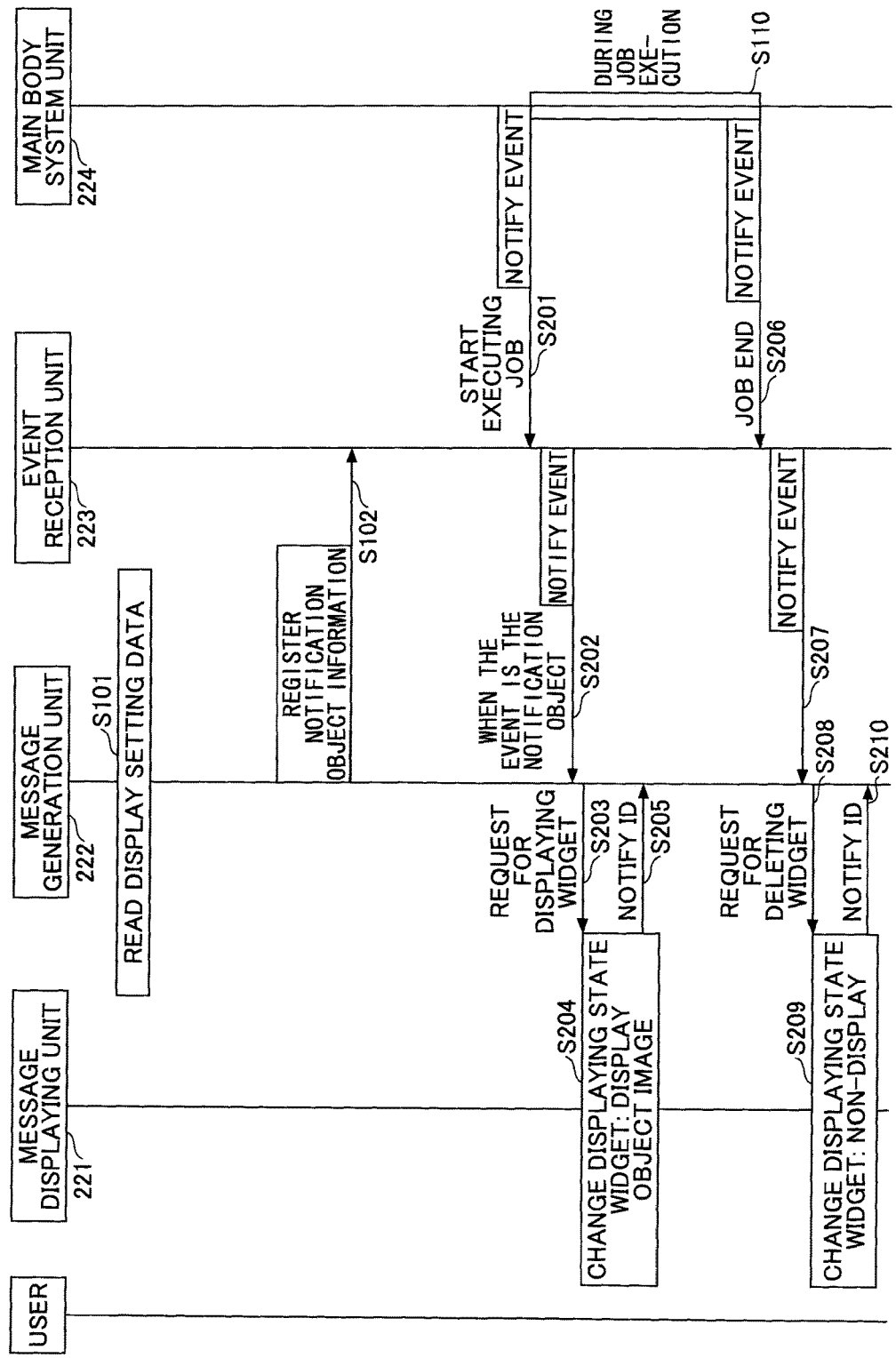

[Fig. 7]
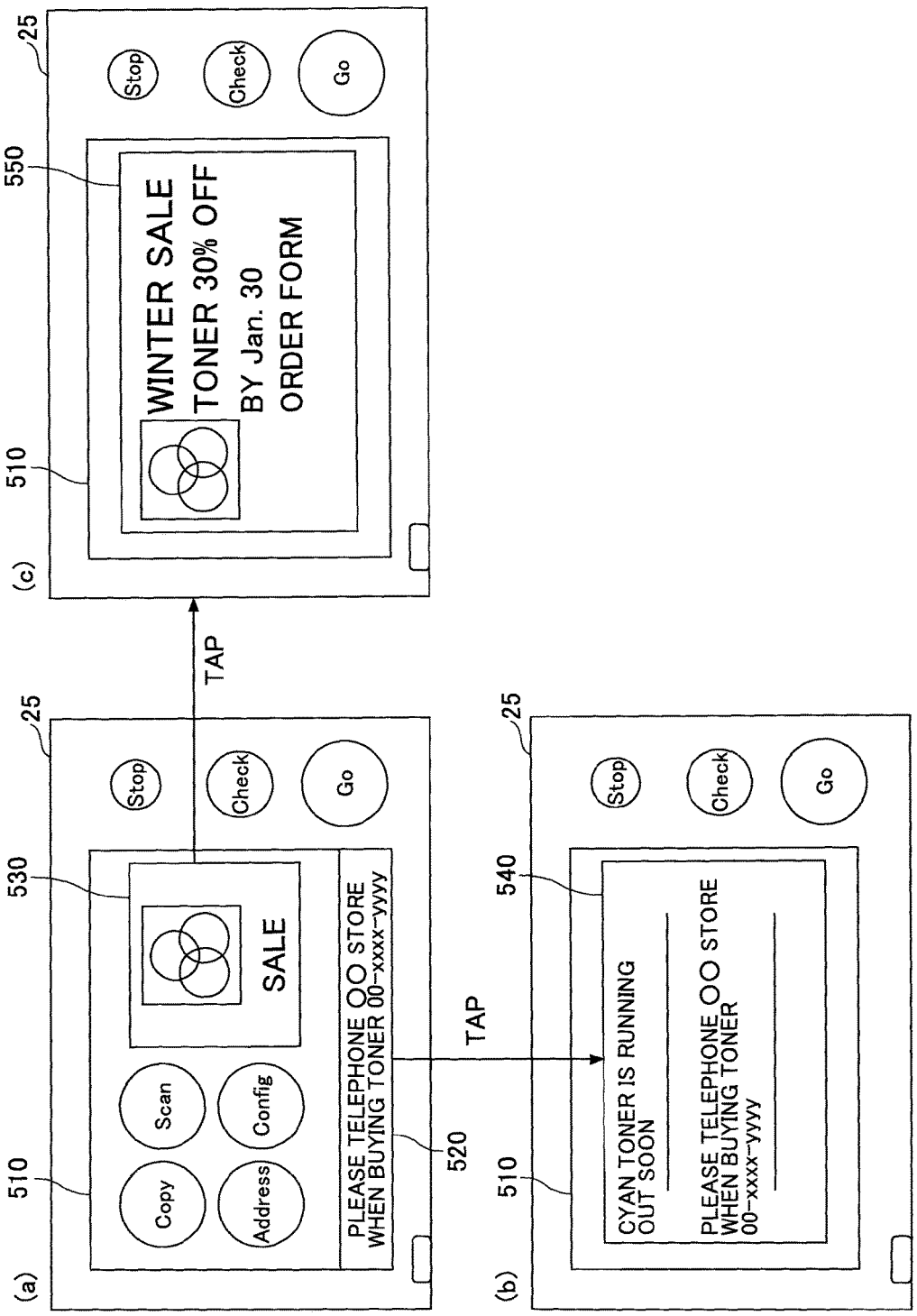

[Fig. 8]
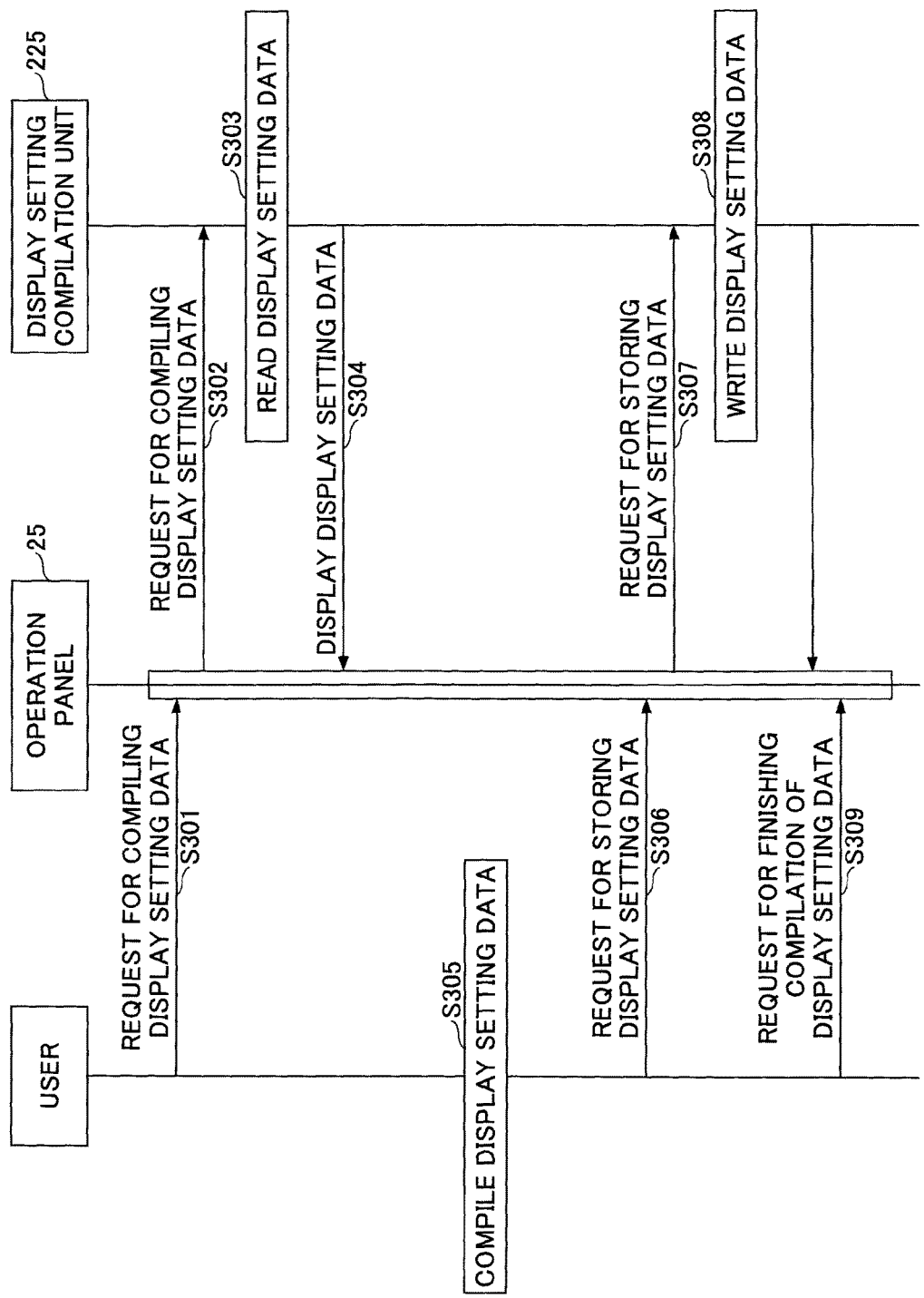

[Fig. 9]
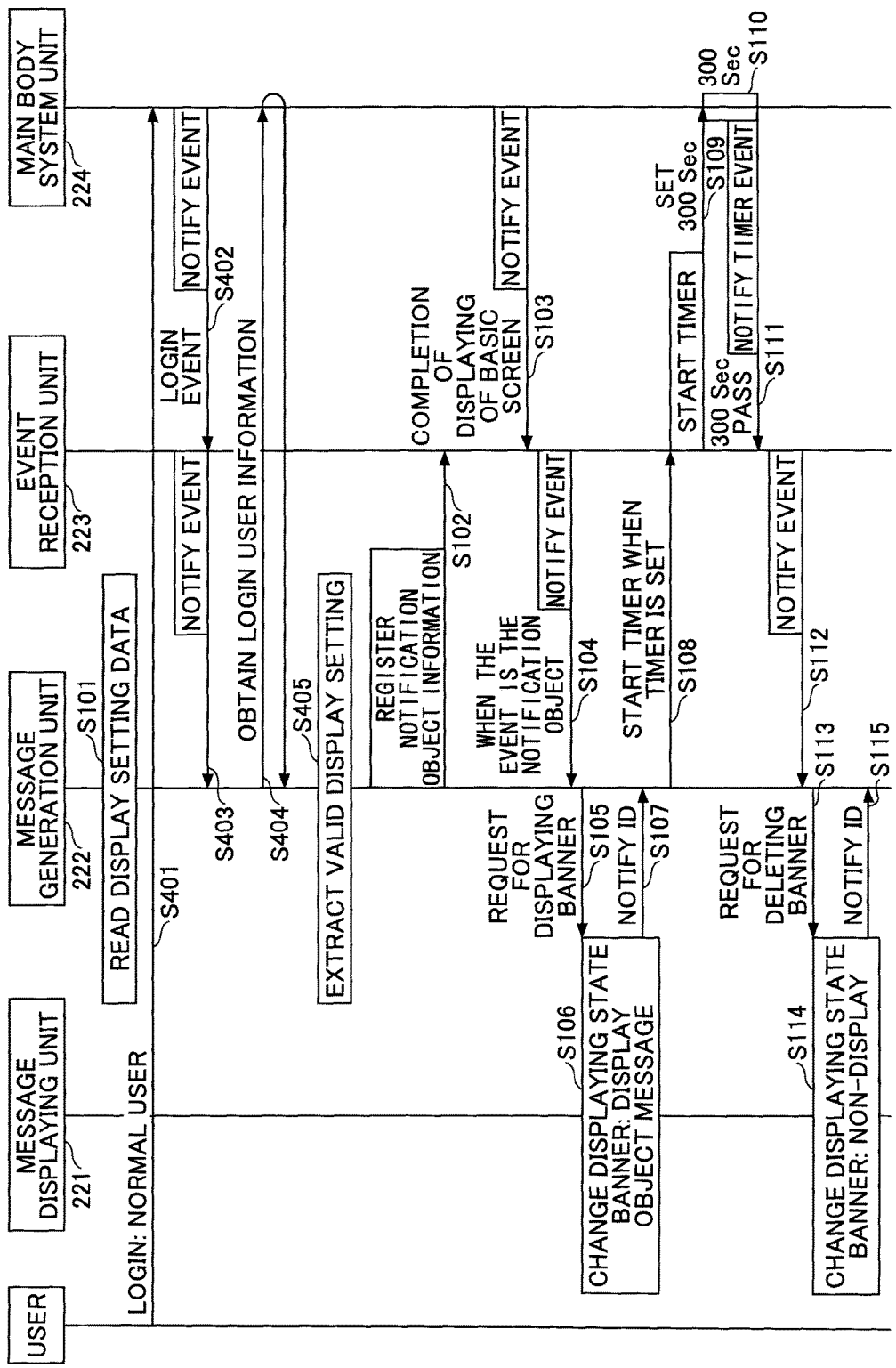

[Fig. 10]

| SETTING NAME | DISPLAY TRIGGER EVENT | DELETE TRIGGER EVENT | DISPLAY PATTERN | DISPLAY CLASSIFICATION | DISPLAY CONTENT | OBJECT USER |
|---|---|---|---|---|---|---|
| WHEN STARTING | COMPLETION OF DISPLAYING OF BASIC SCREEN | TIMER (300 Sec) | BANNER | CHARACTER STRING | CONTACT OO STORE WHEN MALFUNCTION OCCUR | MANAGER AND NORMAL USER |
| WHEN STARTING COPY | JOB EXECUTION (COPY) | JOB END (COPY) | WIDGET | IMAGE | Commercial.jpg | MANAGER AND NORMAL USER |
| TONER NEAR END | TONER NEAR END | CANCEL OF TONER NEAR END | BANNER AND WIDGET | IMAGE + CHARACTER STRING | Toner.jpg CONTACT OO STORE WHEN BUYING TONER TEL: 00-xxxx-yyyy | MANAGER |
| PAPER RUN OUT | PAPER RUN OUT EVENT | CANCEL OF PAPER RUN OUT | BANNER AND WIDGET | IMAGE + CHARACTER STRING | ARE PAPERS STOCKED? CONTACT OO STORE http://ooo.jp/cgi-bin?order | MANAGER |

[Fig. 11]
| SETTING NAME | DISPLAY TRIGGER EVENT | DELETE TRIGGER EVENT |
|---|---|---|
| WHEN STARTING | COMPLETION OF DISPLAYING OF BASIC SCREEN | TIMER (300 Sec) |
| WHEN STARTING COPY | JOB EXECUTION (COPY) | JOB END (COPY) |
[Fig. 12]
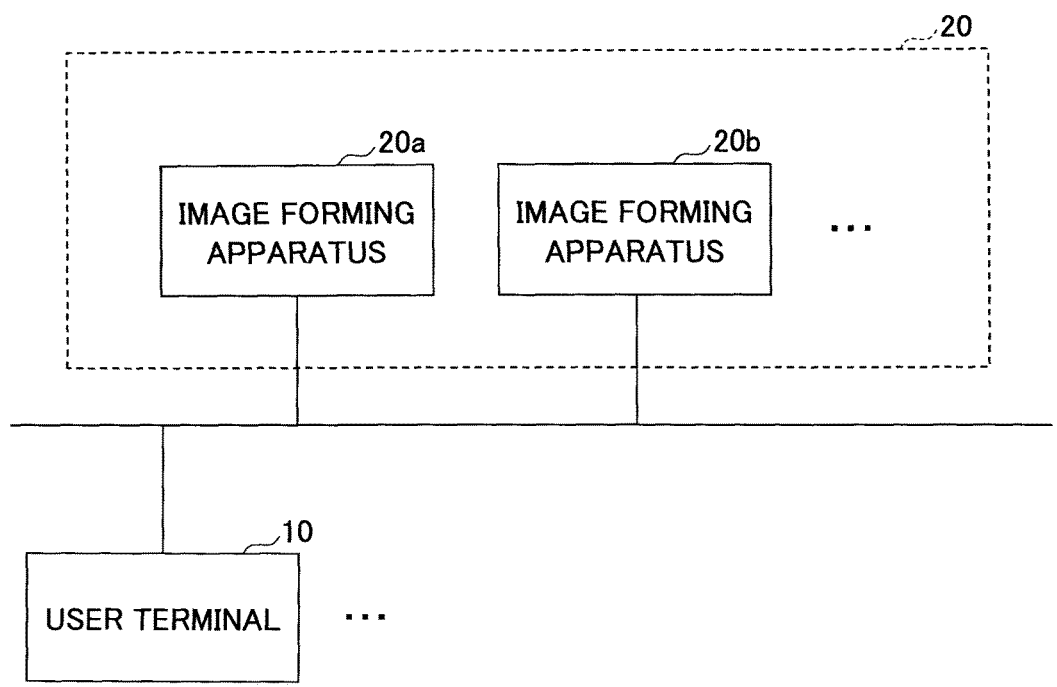

[Fig. 13]
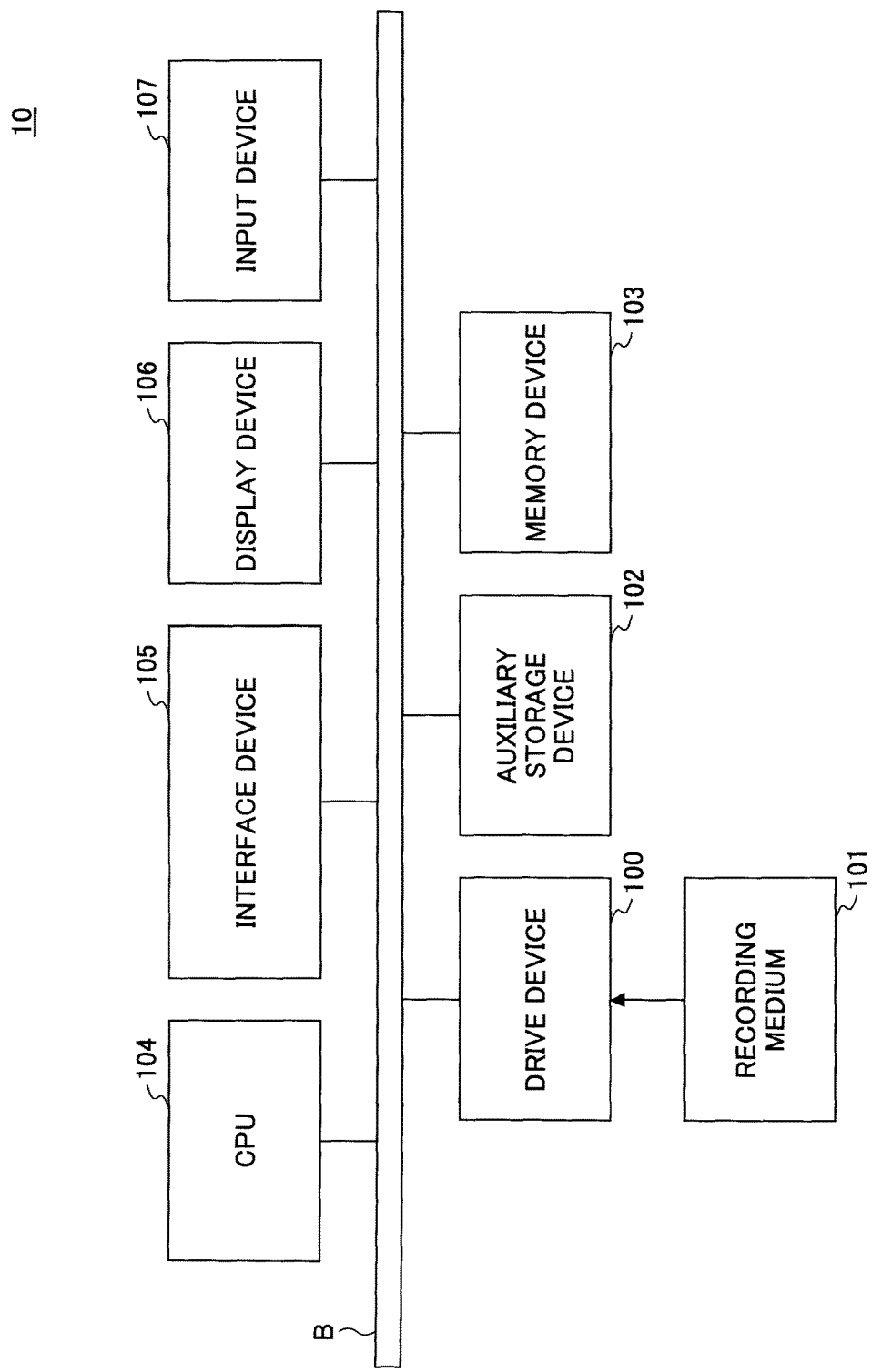

[Fig. 14]
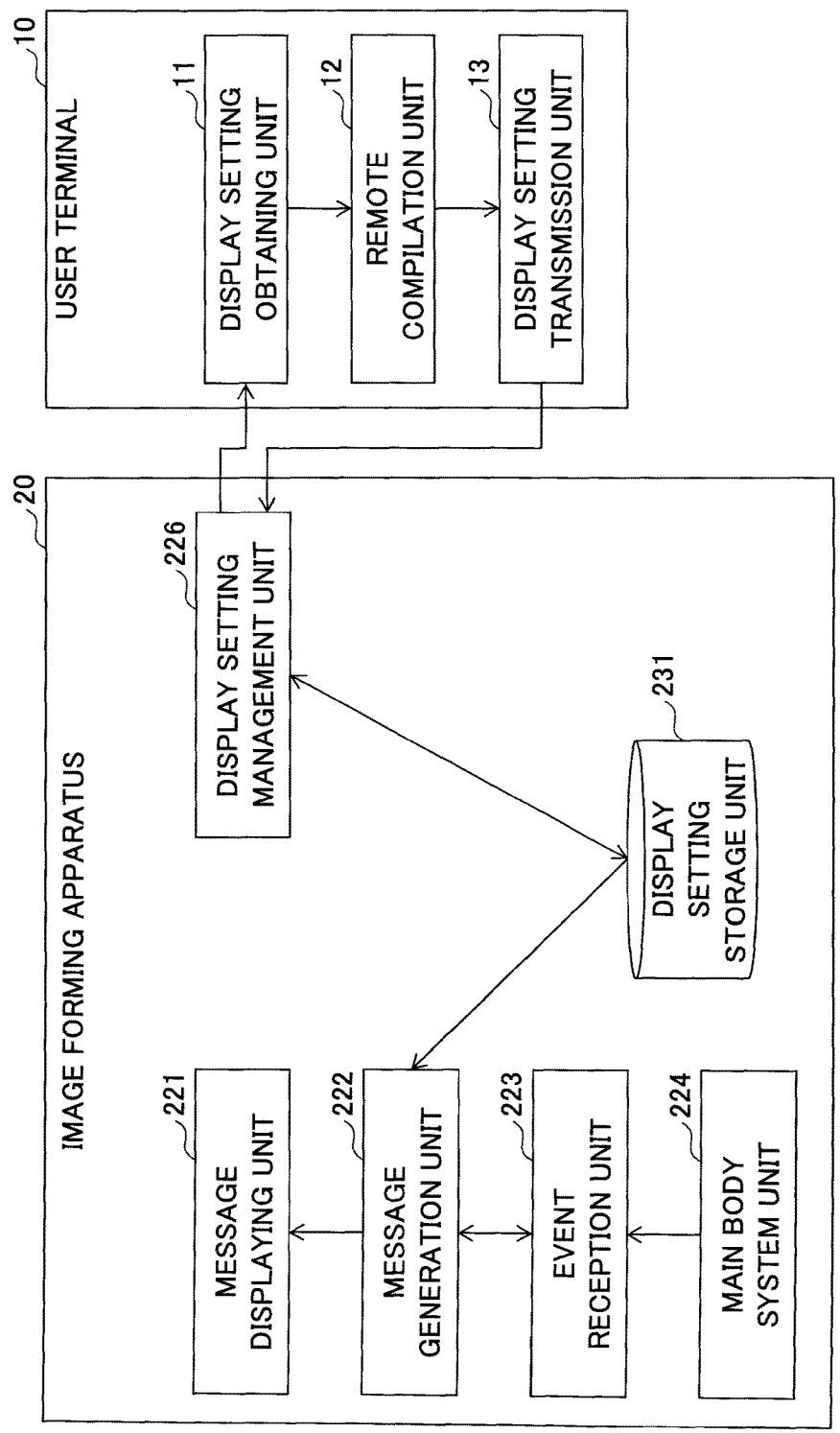

[Fig. 15]
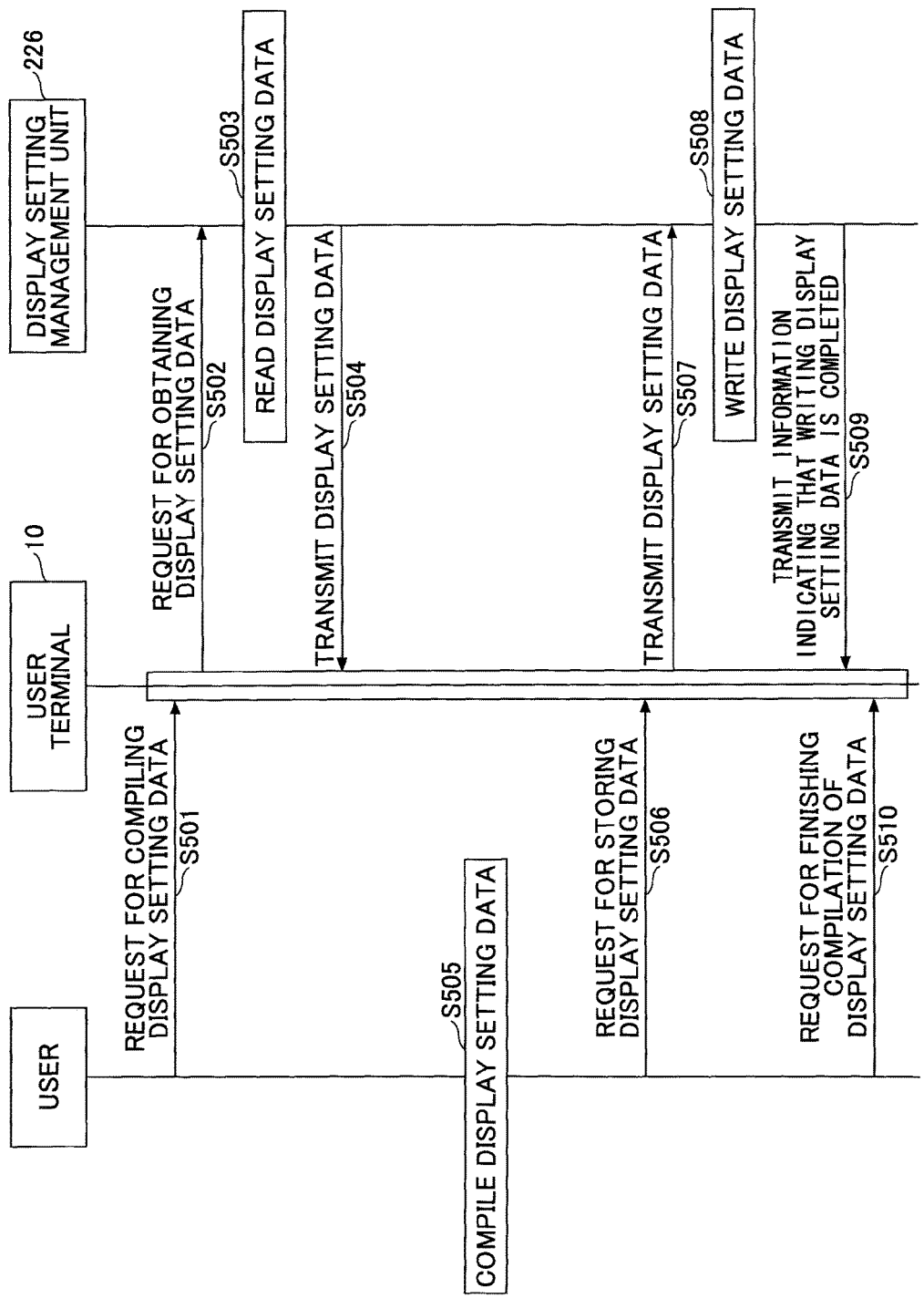

[Fig. 16]
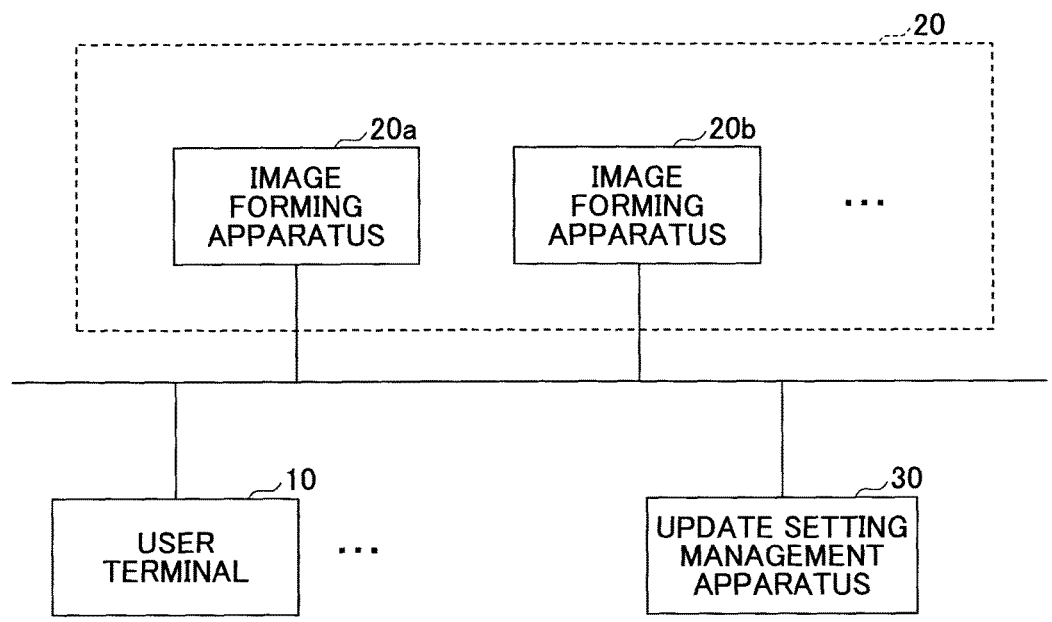

[Fig. 17]
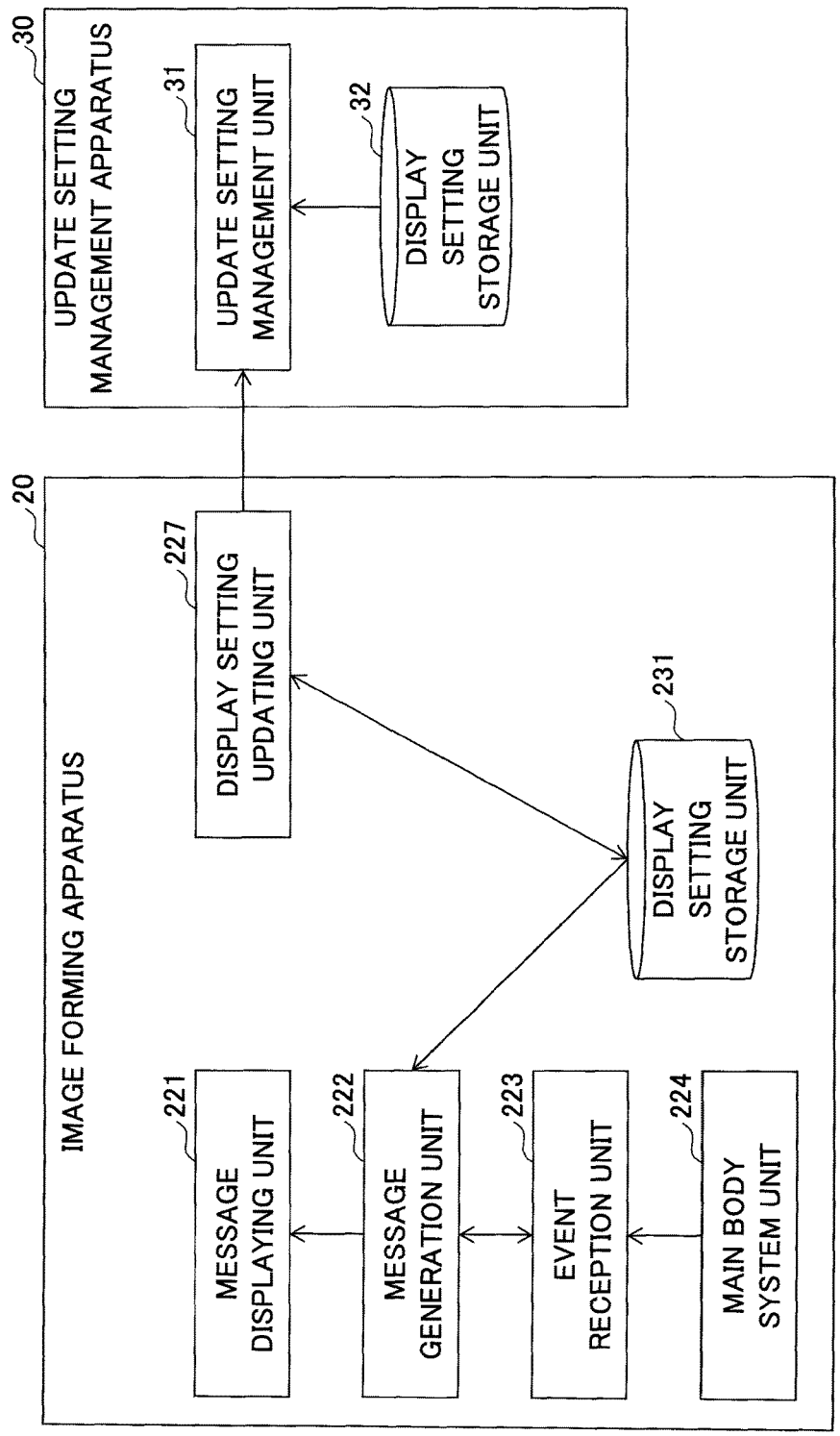

[Fig. 18]
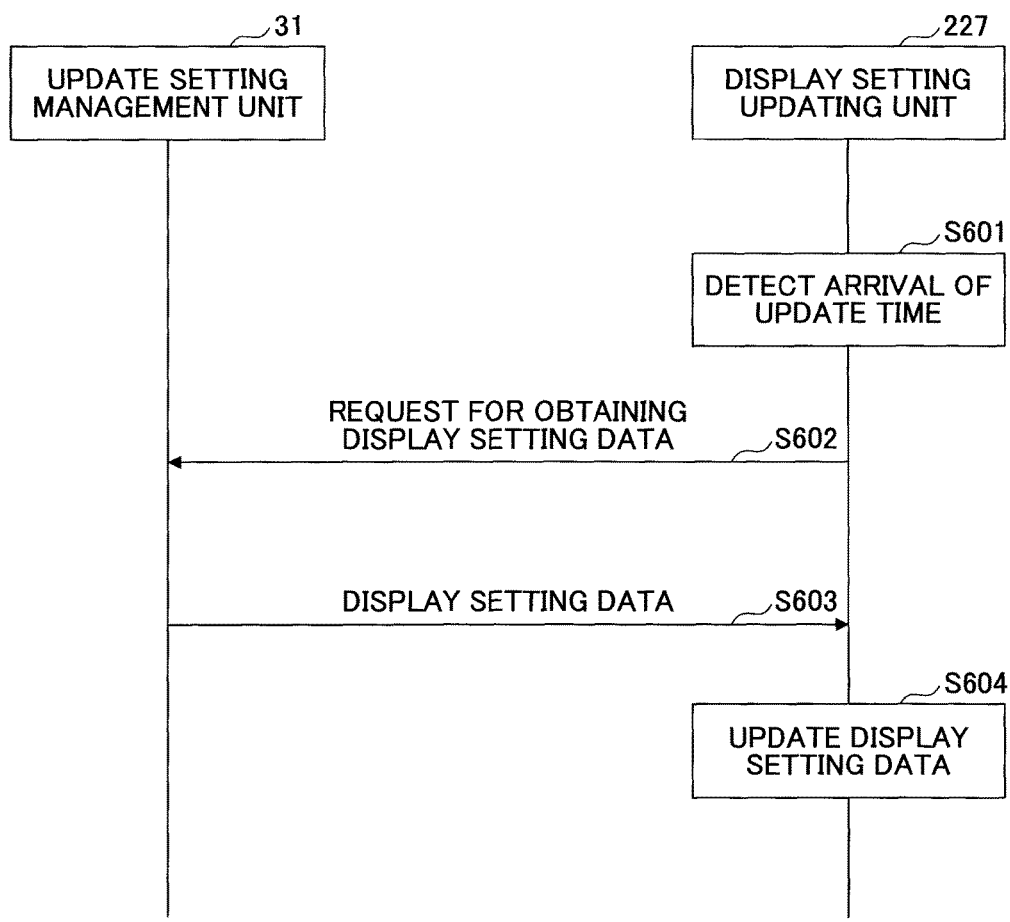

[Fig. 19]

| SETTING NAME | DISPLAY TRIGGER EVENT | DELETE TRIGGER EVENT | DISPLAY PATTERN | DISPLAY CLASSIFI-CATION | DISPLAY CONTENT | UPDATE TIME | REFERENCE DESTI-NATION |
|---|---|---|---|---|---|---|---|
| WHEN STARTING | COMPLETION OF DISPLAYING OF BASIC SCREEN | TIMER (300 Sec) | BANNER | CHARACTER STRING | CONTACT ○○ STORE WHEN MALFUNCTION OCCUR | | |
| WHEN STARTING COPY | JOB EXECUTION (COPY) | JOB END (COPY) | WIDGET | IMAGE | Commercial.jpg | yyyy-mm-dd-hh | ... |
| TONER NEAR END | TONER NEAR END | CANCEL OF TONER NEAR END | BANNER AND WIDGET | IMAGE + CHARACTER STRING | Toner.jpg CONTACT ○○ STORE WHEN BUYING TONER TEL: 00-xxxx-yyyy | | |
| PAPER RUN OUT | PAPER RUN OUT EVENT | CANCEL OF PAPER RUN OUT | BANNER AND WIDGET | IMAGE + CHARACTER STRING | ARE PAPERS STOCKED? CONTACT ○○ STORE http://ooo.jp/cgi-bin?order | | |

[Fig. 20]

| SETTING NAME | DISPLAY TRIGGER EVENT | DELETE TRIGGER EVENT | DISPLAY PATTERN | DISPLAY CLASSIFI-CATION | DISPLAY CONTENT | UPDATE TIME | REFERENCE DESTI-NATION |
|---|---|---|---|---|---|---|---|
| WHEN STARTING | COMPLETION OF DISPLAYING OF BASIC SCREEN | TIMER (300 Sec) | BANNER | CHARACTER STRING | CONTACT ○○ STORE WHEN MALFUNCTION OCCUR | 30D | ... |
| WHEN STARTING COPY | JOB EXECUTION (COPY) | JOB END (COPY) | WIDGET | IMAGE | Commercial.jpg | 24H | ... |
| TONER NEAR END | TONER NEAR END | CANCEL OF TONER NEAR END | BANNER AND WIDGET | IMAGE + CHARACTER STRING | Toner.jpg CONTACT ○○ STORE WHEN BUYING TONER TEL: 00-xxxx-yyyy | | |
| PAPER RUN OUT | PAPER RUN OUT EVENT | CANCEL OF PAPER RUN OUT | BANNER AND WIDGET | IMAGE + CHARACTER STRING | ARE PAPERS STOCKED? CONTACT ○○ STORE http://ooo.jp/cgi-bin?order | | |

[Fig. 21]

| SETTING NAME | DISPLAY TRIGGER EVENT | DELETE TRIGGER EVENT | DISPLAY PATTERN | DISPLAY CLASSIFICATION | DISPLAY CONTENT | UPDATE TIME (COMMON) | REFERENCE DESTINATION (COMMON) | UPDATE TIME (INDIVIDUAL) | REFERENCE DESTINATION (INDIVIDUAL) |
|---|---|---|---|---|---|---|---|---|---|
| WHEN STARTING | COMPLETION OF DISPLAYING OF BASIC SCREEN | TIMER (300 Sec) | BANNER | CHARACTER STRING | CONTACT ○○ STORE WHEN MALFUNCTION OCCUR | | | | |
| WHEN STARTING COPY | JOB EXECUTION (COPY) | JOB END (COPY) | WIDGET | IMAGE | Commercial.jpg | | | 30D | ... |
| TONER NEAR END | TONER NEAR END | CANCEL OF TONER NEAR END | BANNER AND WIDGET | IMAGE + CHARACTER STRING | Toner.jpg CONTACT ○○ STORE WHEN BUYING TONER TEL: 00-xxxx-yyyy | yyyy-mm-dd-hh | ... | 24H | ... |
| PAPER RUN OUT | PAPER RUN OUT EVENT | CANCEL OF PAPER RUN OUT | BANNER AND WIDGET | IMAGE + CHARACTER STRING | ARE PAPERS STOCKED? CONTACT ○○ STORE http://ooo.jp/cgi-bin?order | | | | |

APPARATUS AND METHOD FOR OBTAINING UPDATE INFORMATION VIA A NETWORK TO DISPLAY DATA

TECHNICAL FIELD

The present invention relates to an apparatus, an information processing method, and a computer program product.

BACKGROUND ART

In an apparatus including an operation panel such as a multifunction peripheral, for notifying a user of a state of the apparatus and the remaining amount of a consumable (such as toners of the multifunction peripheral), a display method for displaying a character string in a part of a display area of the operation panel or for displaying a dialogue or the like in the entire operation area is known in the related art.

SUMMARY OF INVENTION

Technical Problem

However, the display method of the related art can only display the character string which is fixedly set in the apparatus and timing of displaying is also fixed.

Solution to Problem

An embodiment provides an apparatus including a display unit in which data is to be displayed; a storage unit configured to store the data to be displayed in the display unit and a display condition for displaying the data; a determination unit configured to determine whether the display condition is satisfied in accordance with a change of status of the apparatus; a display control unit configured to display the data in the display unit in response to an event in which the determination unit determines that the display condition is satisfied; and an updating unit configured to obtain, via a network at a timing represented by information that is stored in association with the data, update information corresponding to at least one of the data and the display condition related to the data, and to update the at least one of the data and the display condition stored in the storage unit based on the update information.

An embodiment provides an information processing method executed by an apparatus including a display unit in which data is to be displayed. The information processing method includes a determination step of determining, with reference to a storage unit which stores the data to be displayed in the display unit and a display condition for displaying the data, whether the display condition is satisfied in accordance with a change of status of the apparatus; a display control step of displaying the data in the display unit in response to an event in which it is determined in the determination step that the display condition is satisfied; and an updating step of obtaining, via a network at a timing represented by information that is stored in association with the data, update information corresponding to at least one of the data and the display condition related to the data, and updating the at least one of the data and the display condition stored in the storage unit based on the update information.

BRIEF DESCRIPTION OF DRAWINGS

FIG. 1 is a block diagram illustrating an example of a hardware configuration of an image forming apparatus according to a first embodiment;

FIG. 2 is a block diagram illustrating an example of a functional configuration of the image forming apparatus according to the first embodiment;

FIG. 3 is a sequence chart illustrating a first example of a processing procedure of a displaying process of a message according to the first embodiment;

FIG. 4 is a table illustrating an example of display setting data according to the first embodiment;

FIG. 5 is a table illustrating examples of notification object information according to the first embodiment;

FIG. 6 is a sequence chart illustrating a second example of the processing procedure of the displaying process of the message according to the first embodiment;

FIG. 7 is a drawing illustrating examples of the messages;

FIG. 8 is a sequence chart illustrating an example of a compilation process of the display setting data according to the first embodiment;

FIG. 9 is a sequence chart illustrating an example of the processing procedure of the displaying process of the message according to a second embodiment;

FIG. 10 is a table illustrating an example of the display setting data according to the second embodiment;

FIG. 11 is a table illustrating examples of the notification object information according to the second embodiment;

FIG. 12 is a block diagram illustrating an example of a system configuration according to a third embodiment;

FIG. 13 is a block diagram illustrating an example of a hardware configuration of a user terminal according to the third embodiment;

FIG. 14 is a block diagram illustrating an example of functional configurations of the image forming apparatus and the user terminal according to the third embodiment;

FIG. 15 is a sequence chart illustrating an example of a compilation process of the display setting data according to the third embodiment;

FIG. 16 is a block diagram illustrating an example of a system configuration according to a fourth embodiment;

FIG. 17 is a block diagram illustrating an example of functional configurations of the image forming apparatus and an update setting management apparatus according to the fourth embodiment;

FIG. 18 is a sequence chart illustrating an example of a processing procedure of an automatic updating process of the displaying setting data according to the fourth embodiment;

FIG. 19 is a table illustrating a first example of the display setting data according to the fourth embodiment;

FIG. 20 is a table illustrating a second example of the display setting data according to the fourth embodiment; and FIG. 21 is a table illustrating a third example of the display setting data according to the fourth embodiment.

DESCRIPTION OF EMBODIMENTS

In the following, embodiments of the present invention will be described with reference to the accompanying drawings. FIG. 1 is a block diagram illustrating an example of a hardware configuration of an image forming apparatus 20 according to a first embodiment. In FIG. 1, the image forming apparatus 20 includes hardware elements such as a controller 21, a scanner 22, a printer 23, a modem 24, an operation panel 25, a network interface 26, and a SD card slot 27.

The controller 21 includes a CPU (Central Processing Unit) 211, a RAM (Random Access Memory) 212, a ROM (Read Only Memory) 213, a HDD (Hard Disk Drive) 214, a NVRAM (Non-Volatile Random Access Memory) 215 and the like. Various programs and data used by the programs are stored in the ROM 213. The RAM 212 is used, for example, as a storage space for loading the programs and a work space at which the loaded programs are processed. The CPU 211 implements various functions of the image forming apparatus 20 by processing the programs loaded on the RAM 212. The HDD 214 stores various programs and data used by the programs. The NVRAM 215 stores various kinds of setting information and the like.

The scanner 22 is a hardware component (image reading unit) for reading image data from a document. The printer 23 is a hardware component (printing unit) for printing print data on a printing paper (sheet). The modem 24 is a hardware component for connecting the image forming apparatus 20 to a telephone line, and is used for sending and receiving image data through facsimile communications. The operation panel 25 is a hardware component includes an input unit, a display unit and the like. The input unit may include buttons for receiving input from a user. The display unit may include a liquid crystal panel. The liquid crystal panel may include a touch panel function. In this case, the liquid crystal panel also serves as the input unit. The network interface 26 is a hardware component for connecting the image forming apparatus 20 to a network (wired or wireless) such as a LAN. The SD card slot 27 is used for reading programs stored in an SD card 80. According to the image forming apparatus 20, in addition to the programs stored in the ROM 213, the programs stored in the SD card 80 can be loaded into the RAM 212 and executed. It should be noted that any other recording medium (for example, a CD-ROM or a Universal Serial Bus (USB) memory) may be used instead of the SD card 80. That is, a type of a recording medium that can be mounted on the image forming apparatus 20 is not limited to the SD card 80. In this case, the SD card slot 27 may be replaced with a hardware component corresponding to the type of the recording medium.

It should be noted that the operation panel 25 may be an apparatus including a CPU and an operating system (OS) independent from the image forming apparatus 20 such as a dedicated or typical smartphone and a tablet terminal. For example, the operating system may be a system widely used in the smartphone or the tablet terminal such as Android (registered trademark). In this way, similar to the smartphone, the tablet terminal or the like, an expressive screen can be displayed and operational feeling can be provided. It should be noted that the operation panel 25 may be realized by another apparatus.

FIG. 2 is a block diagram illustrating an example of a functional configuration of the image forming apparatus 20 according to the first embodiment. In FIG. 2, the image forming apparatus 20 includes a message displaying unit 221, a message generation unit 222, an event reception unit 223, a main body system unit 224, a display setting compilation unit 225 and the like. These units may be implemented by processes which are executed by the CPU 211 or the operation panel 25 based on at least one program installed in the image forming apparatus 20. Further, the image forming apparatus 20 uses (includes) a display setting storage unit 231. The display setting storage unit 231 may be implemented by using, for example, a memory included in the HDD 214 or the operation panel 25, or a storage device which is able to be connected to the image forming apparatus 20 via the network.

The display setting storage unit 231 stores data (referred to as "display setting data" hereinafter) which includes setting information with regard to displaying a message for notifying the user of some information. The display setting data includes, for each message, a combination of a display condition, a delete condition, a display content and the like. The display condition is information which indicates a condition for displaying the message. The delete condition is information which indicates a condition for deleting the message (hiding the message). The display content is data displayed as the message. The data displayed as the message may be a character string or image data. The image data may be a still image or a video image. It should be noted that the display setting data may be stored in a file.

The main body system unit 224 is a part which includes the hardware components shown in FIG. 1, an operating system (OS), a software platform and the like. Further, in a case in which the message displaying unit 221, the message generation unit 222, and the event reception unit 223 are implemented in the operation panel 25, the main body system unit 224 may be the controller 21 or a software group on the controller 21.

In the first embodiment, the main body system unit 224 functions as a source of occurrence of an event. The event is, for example, a phenomenon which indicates a change of status of the image forming apparatus 20. Arrival of a predetermined time, activation (starting) of the image forming apparatus 20, changing to an energy saving state, returning from the energy saving state, starting a job, finishing the job, a change of the remaining amount of a consumable (for example, a change of the remaining amount of toners or papers to an amount equal to or less than a predetermined amount such as running out of toners (toner near end) and running out of papers) or the like may be an example of the event. That is, the change of the status of the image forming apparatus 20 includes at least one of these. The event reception unit 223 determines whether the display condition or the hiding condition is satisfied in accordance with a change of the status of the image forming apparatus 20.

The message generation unit 222 reads the display setting data from the display setting storage unit 231 to set, in the event reception unit 223, the display condition, the delete condition and the like included in the display setting data. When the event reception unit 223 determines that some display condition is satisfied, the message generation unit 222 requests the message displaying unit 221 to display the display content which corresponds to the satisfied display condition. Further, when the event reception unit 223 determines that some delete condition is satisfied, the message generation unit 222 requests the message displaying unit 221 to delete the display content (to hide the display content being displayed in the operation panel 25) which corresponds to the satisfied delete condition.

The event reception unit 223 detects the event which occurs in the main body system unit 224. When the display condition or the delete condition, which has been set by the message generation unit 222, is satisfied by the occurrence of the detected event, the event reception unit 223 notifies the message generation unit 222 that the display condition or the delete condition is satisfied.

The message displaying unit 221 displays, in the operation panel 25, the display content requested to be displayed from the message generation unit 222. Further, the message displaying unit 221 deletes (hides), from the operation panel 25, the display content requested to be deleted (hide) from the message generation unit 222.

The display setting compilation unit 225 generates and/or compiles (edits) the display setting data in accordance with an operation by the user of the image forming apparatus 20. In other words, the display setting compilation unit 225 receives the input of the display setting data.

In the following, a processing procedure executed by the image forming apparatus 20 will be described. FIG. 3 is a sequence chart illustrating a first example of the processing procedure of a displaying process of the message (process for displaying the message) according to the first embodiment.

For example, when an activating (starting) process of the image forming apparatus 20 is completed, in step S101, the message generation unit 222 reads the display setting data from the display setting storage unit 231.

FIG. 4 is a table illustrating an example of the display setting data according to the first embodiment. As shown FIG. 4, the display setting data includes, for each of the messages, a setting name, a display trigger event, a delete trigger event, a display pattern, a display classification, a display content and the like. It should be noted that in the following, information of each row in FIG. 4 is referred to as the "display setting".

The setting name is an identification name given to each of the display settings. The display trigger event is an example of the information described above as the display condition. That is, the display trigger event is information which indicates the event which is a trigger for displaying the message. The delete trigger event is an example of the information described above as the delete condition. That is, the delete trigger event is information which indicates the event which is a trigger for deleting (hiding) the message.

The display pattern is information which indicates a mode for displaying the message. "BANNER", "WIDGET", "BANNER AND WIDGET" and the like may be an example of a value of the display pattern. "BANNER" indicates displaying in a banner format. "WIDGET" indicates displaying in a widget format. "BANNER AND WIDGET" indicates displaying in a format which uses both the banner and the widget.

The display classification is information which indicates a classification of the display content. "CHARACTER STRING", "IMAGE", "IMAGE AND CHARACTER STRING" and the like may be an example of a value of the display classification. "CHARACTER STRING" indicates that the display content is a character string. "IMAGE" indicates that the display content is an image. "IMAGE AND CHARACTER STRING" indicates that the display content is a combination of the image and the character string.

The display content is a content to be displayed (information of a display object). The display content of the display setting whose display classification is the character string is a specific character string of the display object. The display content of the display setting whose display classification is the image is a file name of a file which stores the image of the display object. The display content of the display setting whose display classification is the image and the character string is the file name of the file, which stores the image of the display object, and the specific character string of the display object. It should be noted that the upper limit value of the number of characters may be set for the character string. Further, the upper limit value of a size of the image (height and width) may be set for the image. In these cases, the display content is set within the upper limit values.

It should be noted that in the examples shown in FIG. 4, the character string is displayed with the banner format and the image is displayed with the widget format.

Subsequently, in step S102, the message generation unit 222 registers, on the event reception unit 223, data which includes the setting name, the display trigger event, and the delete trigger event (referred to as "notification object information" herein after), for each of the display settings included in the display setting data.

FIG. 5 is a table illustrating examples of the notification object information according to the first embodiment. As shown in FIG. 5, the setting name, the display trigger event, and the delete trigger event are extracted from each of the display settings shown in FIG. 4.

The event reception unit 223 waits for notification of the event from the main body system unit 224 after the notification object information shown in FIG. 5 is set.

For example, when displaying a basic screen (a home screen or an initial screen), which is displayed in the operation panel 25 first after the image forming apparatus 20 is activated, is completed, the main body system unit 224 notifies the event reception unit 223 of the event "COMPLETION OF DISPLAYING OF BASIC SCREEN" in step S103. The event reception unit 223 determines whether the notified event is a notification object to be reported to the message generation unit 222 based on the notification object information. That is, when the notified event is the display trigger event or the delete trigger event of any of the display settings, the event reception unit 223 determines the notified event as the notification object. The event "COMPLETION OF DISPLAYING OF BASIC SCREEN" corresponds to the display trigger event of the display setting whose setting name is "WHEN STARTING" (referred to as the "first object setting" hereinafter) shown in FIG. 5. Accordingly, the event reception unit 223 notifies the message generation unit 222 of the event "COMPLETION OF DISPLAYING OF BASIC SCREEN" in step S104.

Subsequently, the message generation unit 222 specifies the display setting which corresponds to the notified event among the display settings included in the display setting data. In step S105, the message generation unit 222 requests the message displaying unit 221 to display the message which corresponds to the specified display setting. As shown in FIG. 4, the display pattern of the first object setting is "BANNER" and the display classification of the first object setting is "CHARACTER STRING". Thus, the message generation unit 222 requests the message displaying unit 221 to display the banner of the character string being designated as the display content of the first object setting.

In response to the request from the message generation unit 222, the message displaying unit 221 changes a display state of a screen being displayed in the operation panel 25 in step S106. In this case, the character string of "CONTACT ○○ STORE WHEN MALFUNCTION OCCUR" is displayed as the banner.

Subsequently, the message displaying unit 221 generates display ID which is identification information corresponding to the banner being displayed currently, and returns the generated display ID to the message generation unit 222 in step S107. The message generation unit 222 stores the display ID in association with the first object setting.

As shown in FIG. 4, the delete trigger event of the first object setting is a timer event which occurs when a predetermined time period set as a timer passes. That is, the message of the first object setting is set such that the message is deleted when the predetermined time period (300 seconds) passes after starting displaying the message. Thus, the message generation unit 222 requests the event reception unit 223 to start the timer of 300 seconds (start counting 300 seconds) in step S108. The event reception unit 223 sets the timer of 300 seconds in the main body system unit 224 in step S109. It should be noted that at this time, the event reception unit 223 also stores the timer event, which occurs when the predetermined time period set as the timer passes, as the notification object to be reported to the message generation unit 222.

The main body system unit 224, in which the timer has been set, measures 300 seconds in step S110. When 300 seconds passes, the main body system unit 224 notifies the event reception unit 223 of the timer event in step S111. Because the timer event is stored as the notification object, in step S112, the event reception unit 223 notifies the message generation unit 222 of the timer event reported from the main body system unit 224.

Subsequently, the message generation unit 222 searches for the display setting in which the timer event is set as the display trigger event or the delete trigger event from the display settings. In this case, the first object setting corresponds to the display setting. Thus, the message generation unit 222 requests the message displaying unit 221 to delete (hide) the message in step S113 while designating the display ID associated with the first object setting.

In response to the request, the message displaying unit 221 deletes the message in step S114 which corresponds to the display ID designated in the request. In this case, the message displayed in the banner in step S106 is deleted. Subsequently, in step S115, the message displaying unit 221 notifies the message generation unit 222 of the display ID which corresponds to the message deleted successfully. The message generation unit 222 cancels association between the display ID and the first object setting.

According to the processing procedure shown in FIG. 3, a predetermined message can be reported to the user in response to activating (starting) the image forming apparatus 20, automatically.

Subsequently, an example in which a widget is displayed during execution of a job will be described. FIG. 6 is a sequence chart illustrating a second example of the processing procedure of the displaying process of the message according to the first embodiment. In FIG. 6, step numbers which corresponds to the step numbers in FIG. 3 are referred to by the same step numbers, and their descriptions may be omitted as appropriate.

For example, when a copy job is started, the main body system unit 224 notifies the event reception unit 223 of an event "JOB EXECUTION (COPY)" in step 201. The event reception unit 223 determines whether the notified event is the notification object to be reported to the message generation unit 222 based on the notification object information (shown in FIG. 5). As shown in FIG. 5, the event "JOB EXECUTION (COPY)" corresponds to the display trigger event of the display setting whose setting name is "WHEN STARTING COPY" (referred to as the "second object setting" hereinafter). Thus, the event reception unit 223 notifies the message generation unit 222 of the event "JOB EXECUTION (COPY)" in step S202.

Subsequently, the message generation unit 222 specifies the display setting which corresponds to the notified event among the display settings included in the display setting data. In step S203, the message generation unit 222 requests the message displaying unit 221 to display the message which corresponds to the specified display setting. As shown FIG. 4, the display pattern of the second object setting is "WIDGET" and the display classification of the second object setting is "IMAGE". Thus, the message generation unit 222 requests the message displaying unit 221 to display the widget while designating the file name designated in the display content of the second object setting.

In response to the request from the message generation unit 222, the message displaying unit 221 changes a display state of a screen being displayed in the operation panel 25 in step S204. In this case, a widget is displayed in which an image stored in a file whose file name is Commercial.jpg is drawn. It should be noted that the image may be an image which indicates an advertisement for a shop of the image forming apparatus 20, for example.

Subsequently, the message displaying unit 221 generates display ID which corresponds to the displayed widget to return the generated display ID to the message generation unit 222 in step S205. The message generation unit 222 associates the display ID with the second object setting.

After that, when the copy job is finished, the main body system unit 224 notifies the event reception unit 223 of an event "JOB END (COPY)" in step S206. The event reception unit 223 determines whether the notified event is the notification object to the message generation unit 222 based on the notification object information (shown in FIG. 5). The event "JOB END (COPY)" corresponds to the delete trigger event of the second object setting. Thus, the event reception unit 223 notifies the message generation unit 222 of the event "JOB END (COPY)" in step S207.

Subsequently, the message generation unit 222 searches for the display setting in which the event of "JOB END (COPY)" is set as the display trigger event or the delete trigger event from the display settings. In this case, the second object setting corresponds to the display setting. Thus, the message generation unit 222 requests the message displaying unit 221 to delete the message in step S208 while designating the display ID associated with the second object setting.

In response to the request, the message displaying unit 221 deletes the message in step S209 which corresponds to the display ID designated in the request. In this case, the widget displayed in step S204 is deleted. Subsequently, in step S210, the message displaying unit 221 notifies the message generation unit 222 of the display ID corresponding to the widget deleted successfully. The message generation unit 222 cancels the association between the display ID and the second object setting.

According to the processing procedure shown in FIG. 6, the predetermined message can be automatically reported to the user only during the period in which the job is being executed.

It should be noted that in the processing procedure in FIG. 3 or FIG. 6, the messages are displayed as shown in FIG. 7, for example. FIG. 7 is a drawing illustrating examples of the messages.

As shown In FIG. 7(*a*), in the basic screen 510 displayed on the operation panel 25, the banner 520 and the widget 530 are displayed.

The banner 520 is displayed in an edge part (for example, along a lower hem) of the basic screen 510. The banner 520 is displayed in an outside area of an area for normal operation such that the banner 520 does not obstruct other display elements in the basic screen 510. Further, changing displaying positions of the banner 520 (for example, displaying in a front face of the basic screen 510), deleting the banner 520 or the like may be performed easily according to a button operation, a flick operation or the like.

A long sentence to some extent can be displayed in the banner 520. Further, a plurality of character strings can be displayed in the banner 520 at the same time. Because a displaying area of the banner 520 has a limit, in a case in which the character strings are set, one of the character strings as the display object may be changed to another of the character strings at an interval of several seconds.

Further, one of the character strings as the display object may be changed to another of the character strings according to a scroll operation.

As shown In FIG. 7(b), in a case in which the banner 520 is tapped (selected) by the user who browses the banner 520, the message displaying unit 221 may display, in the operation panel 25, a detail screen 540 which includes detailed information with regard to the message displayed in the banner 520. The detailed information may include, for example, information with regard to the event which has been the trigger for displaying the banner 520. Among the detailed information items, information not being able to be displayed in the detail screen 540 (too much for displaying) may be displayed according to a flick operation or a scroll operation by the user.

On the other hand, the widget 530 may be, for example, a display element being able to be displayed graphically on the basic screen 510 side by side, similar to various icons. As shown In FIG. 7(a), both the image and the character string can be displayed in the widget 530. For example, the widget 530 may be implemented by using a layout language such as hypertext markup language (HTML) and defining designation of the image and the character string for the display object, arrangement of the image and the character string, and sizes of the image and the character string.

A displaying position of the widget 530 may be changed by the user. For example, in a case in which the widget 530 is displayed in a screen which includes a plurality of faces in which the faces of the display object are changed according to a flick operation or the like, the displaying position of the widget 530 may be changed within the faces.

As shown In FIG. 7(c), also in a case in which the widget 530 is tapped (selected) by the user, the message displaying unit 221 may display, in the operation panel 25, a detail screen 550 which includes detailed information with regard to the display content in the widget 530. In the detail screen 550, the detailed information, which includes the display content in the widget 530 as a part, is displayed. However, detailed information which does not include the display content of the widget 530 may be displayed in the detail screen 550.

A plurality of display contents can be set in the widget 530 at the same time. In this case, for notifying the user of pieces of information, one of the display contents may be changed to another of the display contents at an interval of several seconds. Further, one of the display contents as the display object may be changed to another of the display contents according to a side flick operation. Further, when a tab is displayed, the display contents may be changed according to an operation of the tab.

It should be noted that although the advertisements are displayed in the banner 520 and the widget 530 as the display objects, information displayed in the banner 520 and the widget 530 is not limited to the advertisement. For example, an announcement of a maintenance period of the image forming apparatus 20 may be displayed. Further, information for business irrelevant to the image forming apparatus 20 may be displayed. Other information may be displayed.

In the following, a compilation process (generation process) of the display setting data will be described. FIG. 8 is a sequence chart illustrating an example of a processing procedure of the compilation process of the display setting data (process for compiling the display setting data) according to the first embodiment. In FIG. 8, a user who has authority for compiling the display setting data is logging into the image forming apparatus 20.

When the user inputs a compilation request for compiling the display setting data via the operation panel 25 in step S301, the compilation request is reported to (input into) the display setting compilation unit 225 in step S302. In response to the compilation request, the display setting compilation unit 225 reads the display setting data from the display setting storage unit 231 in step S303. Subsequently, the display setting compilation unit 225 displays, in the operation panel 25, a compilation screen for compiling the display setting data in step S304. It should be noted that in a case in which the display setting data is newly generated (for example, the display setting data is not stored in the display setting storage unit 231), a value of each item of the display setting data in the compilation screen may be a blank or a preset value may be displayed in the compilation screen. Further, a configuration of the compilation screen is not limited to this. For example, the compilation screen may be a screen in which the display setting data is displayed in a tabular form as shown in FIG. 4 in order to allow the user to compile the display setting data.

The user compiles (edits) the display setting data via the compilation screen in step S305. For example, compiling (changing) the items of the present display setting, deleting the present display setting, or adding a new display setting may be performed. When a storage request for storing the display setting data is input in steps S306 and S307 after the compilation is completed, the display setting compilation unit 225 writes (stores), on the display setting storage unit 231, the display setting data as the result of the compilation in step S308.

After that, when the user inputs a finish request for finishing the compilation of the display setting data in step S309, the display setting compilation unit 225 finishes the compilation process of the display setting data.

As described above, according to the first embodiment, the image forming apparatus 20 can display the notification information such as the message based on the display setting data which is able to be compiled. The timing for displaying and deleting the notification information is in accordance with the display setting data. That is, the timing for displaying and deleting each of the notification information items can be set by the user arbitrarily. For example, the first embodiment can display, in the image forming apparatus 20, unique information for unique shop(s) of the image forming apparatus 20 or for unique user(s) of the image forming apparatus 20 at unique timing(s). Thus, in the first embodiment, flexibility with regard to displaying the information in the image forming apparatus 20 can be improved.

Next, a second embodiment will be described. In the following, differences between the second embodiment and the first embodiment will be described. Thus, features of the second embodiment, which are not specifically described in the following, may be similar to the features of the first embodiment. In the description of the second embodiment, an example will be described in which a message being able to be displayed is changed in accordance with a user of the image forming apparatus 20.

FIG. 9 is a sequence chart illustrating an example of the processing procedure of the displaying process of the message according to the second embodiment. In FIG. 9, step numbers which corresponds to the step numbers in FIG. 3 are referred to by the same step numbers, and their descriptions may be omitted as appropriate.

In FIG. 9, in step S101, the display setting data as shown in FIG. 10 is read.

FIG. 10 is a table illustrating an example of the display setting data according to the second embodiment. In FIG.

10, the display setting data further includes an item of an object user. The object user is information which indicates a classification of the user (referred to as "user classification" in the following,) for whom the corresponding display setting is valid. The user classification is distinguished by operation authority for the image forming apparatus 20. In the second embodiment, the user classification includes a manager user and a normal user. The manager user is a user who has manager authority (administrator authority). The user who has the manager authority may be, for example, a user who can use a management function of the image forming apparatus 20. The management function of the image forming apparatus 20 may be, for example, a function for changing various kinds of setting information with regard to the image forming apparatus 20. The normal user is a user who does not have the manager authority. For example, the normal user can use functions of the image forming apparatus 20 such as a copying function, a scanning function, and a printing function.

As shown in FIG. 10, it is indicated that the display settings of the first row and the second row are valid for both the manager user and the normal user. On the other hand, the display settings of the third row and the fourth row are valid only for the manager user.

When some user operates the operation panel 25 in order to perform a login operation (such as inputting a user name and a password, or holding a predetermined card or an authentication device including an authentication function such as a smartphone and a mobile phone over it) into the image forming apparatus 20 in step S401 after the image forming apparatus 20 is activated and step S101 is executed, the main body system unit 224 performs authentication of the user. In a case in which the authentication has succeeded, the main body system unit 224 determines the user classification. In this case, the user is the normal user. It should be noted that the user classification (or the authority of the user) may be stored in, for example, a memory included in the HDD 214 or the operation panel 25, or an external device which is able to be connected to the image forming apparatus 20 via the network in association with the user names. Further, in the case in which the authentication has succeeded, the main body system unit 224 notifies the event reception unit 223 of a login event which indicates that the user logs into the image forming apparatus 20 in step S402. The event reception unit 223 notifies the message generation unit 222 of the login event in step S403. The event reception unit 223 notifies the message generation unit 222 of all events because the notification object information is not registered in the event reception unit 223 at that time.

In response to the login event, the message generation unit 222 obtains login user information from the main body system unit 224 in step S404. The login user information is information with regard to the login user. The login user information may include, for example, the user classification and the user name of the login user.

Subsequently, the message generation unit 222 extracts the display setting(s) valid for the login user from the display setting data (shown in FIG. 10) in step S405. In this case, the display settings of the first row and the second row, shown in FIG. 10, are extracted because the login user is the normal user.

Subsequently, in step S102, the message generation unit 222 registers, on the event reception unit 223, the notification object information which corresponds to the extracted display settings.

FIG. 11 is a diagram illustrating an example of the notification object information according to the second embodiment. In FIG. 11, the notification object information which corresponds to the display settings of the first row and the second row in FIG. 10 are displayed.

Thus, the event reception unit 223 does not report events which do not correspond to the display trigger events or the delete trigger events shown in FIG. 11. As a result, the display settings of the third row and the fourth row in FIG. 10 are invalidated.

Steps subsequent to step S103 in FIG. 9 are executed similarly to the process shown in FIG. 3. It should be noted that in a case in which the login user logs out, the event reception unit 223 may clear the notification object information being set.

As described above, in the second embodiment, the valid display setting can be changed in accordance with the user classification. It should be noted that the valid display setting may be changed in accordance with a user name or a group distinguished by information other than the operation authority.

Next, a third embodiment will be described. In the following, differences between the third embodiment and the first and second embodiments will be described. Thus, features of the third embodiment, which are not specifically described, may be similar to the features of the first and second embodiments.

FIG. 12 is a block diagram illustrating an example of a system configuration according to the third embodiment. In FIG. 12, one or more image forming apparatuses 20, which include the image forming apparatus 20a and the image forming apparatus 20b, are connected to a user terminal 10 in a communicative manner via the network (wired or wireless) such as the local area network (LAN) and the Internet.

The user terminal 10 is a terminal used for generating and compiling the display setting data. For example, a personal computer (PC), a mobile phone, a smartphone, and a tablet type terminal, a personal digital assistance (PDA) or the like may be used as the user terminal 10.

FIG. 13 is a block diagram illustrating an example of a hardware configuration of the user terminal 10 according to the third embodiment. In FIG. 13, the user terminal 10 includes a drive device 100, an auxiliary storage device 102, a memory device 103, a CPU 104, an interface device 105, a display device 106, an input device 107, and the like which are connected to each other via a bus B.

A program for implementing a process executed in the user terminal 10 may be provided by a recording medium 101 such as a CD-ROM. When the recording medium 101 which stores the program is set in the drive device 100, the program is installed into the auxiliary storage device 102 from the recording medium 101 via the drive device 100. It should be noted that installing the program may be performed by downloading the program from another computer via the network. The auxiliary storage device 102 stores the installed program, necessary files, data and the like.

The memory device 103 reads out and stores the program from the auxiliary storage device 102 in response to an instruction for starting the program. The CPU 104 implements various functions of the user terminal 10 according to the program stored in the memory device 103. The interface device 105 may be used for connecting the user terminal 10 to the network. The display device 106 displays a graphical user interface (GUI) and the like according to the program. The input device 107 may include a keyboard, a mouse, and the like, and be used for inputting various operational instructions.

FIG. 14 is a block diagram illustrating an example of functional configurations of the image forming apparatus 20 and the user terminal 10. In FIG. 14, the image forming apparatus 20 includes a display setting management unit 226. In response to the request from the user, the display setting management unit 226 transmits, to the user terminal 10 via the network, the display setting data stored in the display setting storage unit 231. Further, the display setting management unit 226 receives the display setting data transmitted from the user terminal 10, and writes the received display setting data on the display setting storage unit 231. It should be noted that the image forming apparatus 20 may include the display setting compilation unit 225 in the third embodiment.

On the other hand, the user terminal 10 includes a display setting obtaining unit 11, a remote compilation unit 12, a display setting transmission unit 13 and the like. These units may be implemented by processes which are executed by the CPU 104 based on at least one program installed in the user terminal 10.

The display setting obtaining unit 11 obtains the display setting data from the image forming apparatus 20. The remote compilation unit 12 generates or compiles the display setting data in accordance with the operation by the user of the user terminal 10. In other words, the remote compilation unit 12 can receive the input of the display setting data. The display setting transmission unit 13 transmits, to the image forming apparatus 20, the display setting data generated or compiled by the remote compilation unit 12.

FIG. 15 is a sequence chart illustrating an example of the processing procedure of the compilation process of the displaying setting data according to the third embodiment. In FIG. 15, the user operates the user terminal 10.

When the user inputs a compilation request for compiling the display setting data to the user terminal 10 in step S501, the display setting obtaining unit 11 transmits, to the image forming apparatus 20, an obtaining request for obtaining the display setting data in step S502. It should be noted that the image forming apparatus 20 of an obtaining destination (source) from which the display setting data is obtained may be selected by the user. Further, the selection of the image forming apparatus 20 may be performed by inputting an IP address of the image forming apparatus 20 or by selecting from a list of the image forming apparatuses 20. When the selection of the image forming apparatus 20 that is the obtaining destination (source), from which the display setting data is obtained, is performed, the display setting obtaining unit 11 transmits, to the image forming apparatus 20 selected by the user, the obtaining request for obtaining the display setting data. Further, a remote login process of the user into the image forming apparatus 20 may be performed before the process in step S502 is executed. In this case, steps subsequent to step S502 may be executed when the remote login process to the image forming apparatus 20 has succeeded.

In response to receiving the obtaining request of the display setting data, the display setting management unit 226 of the image forming apparatus 20 reads the display setting data from the display setting storage unit 231 in step S503. Subsequently, the display setting management unit 226 transmits (sends) the read display setting data to the user terminal 10 in step S504.

When the display setting obtaining unit 11 receives the display setting data, the remote compilation unit 12 displays, in the user terminal 10, the compilation screen of the display setting data. It should be noted that in a case in which the display setting data is newly generated (for example, the display setting data is not stored in the display setting storage unit 231 of the image forming apparatus 20 of the obtaining destination), in the compilation screen, values of items of the display setting data may be blanks or preset values may be displayed. Further, a configuration of the compilation screen is not limited to this. For example, the compilation screen may be a screen in which the display setting data is displayed in tabular form as shown in FIG. 4 such that the display setting data can be compiled.

The user compiles the display setting data via the compilation screen in step S505. The compilation content may be similar to the process described in FIG. 8. In response to the compilation operation by the user, the remote compilation unit 12 reflects the compilation operation in the display setting data.

After the compilation is completed, when a storage request for storing the display setting data is input in step S506, the display setting transmission unit 13 transmits the compiled display setting data to the image forming apparatus 20 in step S507. At this time, the image forming apparatus 20 of a transmission destination, to which the display setting data is to be transmitted, may be selected by the user. That is, the transmission destination of the compiled display setting data may be different from the image forming apparatus 20 of the obtaining destination (source) from which the display setting data before being compiled has been obtained. Further, two or more image forming apparatuses 20 may be selected (designated) as the transmission destination of the display setting data.

In response to receiving the display setting data, the display setting management unit 226 of the image forming apparatus 20, designated as the transmission destination of the display setting data, writes the received display setting data on the display setting storage unit 231 in step S508. Subsequently, in step S509, the display setting management unit 226 sends (transmits), to the user terminal 10, the response which indicates that writing the display setting data is completed. After that, when the user inputs a finish request for finishing the compilation of the display setting data in step S510, the remote compilation unit 12 finishes the compilation process of the display setting data.

It should be noted that steps S502 to S504 may not be executed in a case in which the display setting data is newly generated. Further, a source of compiling is not limited to the display setting data obtained from the image forming apparatus 20. Display setting data stored in the user terminal 10 or the like may be an object to be compiled.

As described above, according to the third embodiment, the user can generate or compile the display setting data using the user terminal 10. At this time, the same display setting data can be set in two or more image forming apparatuses 20 simultaneously. Thus, a workload for setting the display setting data can be reduced.

Next, a fourth embodiment will be described. In the following, differences between the fourth embodiment and the first through third embodiments will be described. Thus, features of the fourth embodiment, which are not specifically described, may be similar to the features of the first embodiment, the second embodiment or the third embodiment.

FIG. 16 is a block diagram illustrating an example of a system configuration according to the fourth embodiment.

Because the image forming apparatuses 20a and 20b, and the user terminal 10 have configurations similar to those of the third embodiment in FIG. 12, their descriptions are omitted.

In FIG. 16, an update setting management apparatus 30 is added. The update setting management apparatus 30 is connected to the image forming apparatuses 20a and 20b via the network in a communicative manner. The update setting management apparatus 30 is one or more computers that manage updated display setting data (for example, the display setting data of the latest version). For example, the update setting management apparatus 30 has a hardware configuration as shown in FIG. 13. However, the update setting management apparatus 30 does not have to include the display apparatus 106 and the input device 107.

It should be noted that a plurality of update setting management apparatuses 30 may be arranged. Further, in the fourth embodiment, it is not necessary to use the user terminal 10.

FIG. 17 is a block diagram illustrating an example of functional configurations of the image forming apparatus 20 and the update setting management apparatus 30. In FIG. 17, similar to the first embodiment shown in FIG. 2, the image forming apparatus 20 includes the message displaying unit 221, the message generation unit 222, the event reception unit 223, and the main body system unit 224 although their descriptions are omitted. In FIG. 17, the image forming apparatus 20 includes a display setting updating unit 227. The display setting updating unit 227 may be implemented by processes which are executed by the CPU 211 based on at least one program installed in the image forming apparatus 20. The display setting updating unit 227 automatically obtains the display setting data managed by the update setting management apparatus 30 at a predetermined timing to update the display setting data stored in the display setting storage unit 231 based on the obtained display setting data. It should be noted that in the fourth embodiment, the image forming apparatus 20 may include the display setting compilation unit 225 and/or the display setting management unit 226.

On the other hand, the update setting management apparatus 30 includes an update setting management unit 31. The update setting management unit 31 may be implemented by processes which are executed by a CPU of the update setting management apparatus 30 based on at least one program installed in the update setting management apparatus 30. Further, the update setting management apparatus 30 uses an update setting storage unit 32. The update setting storage unit 32 may be implemented by using an auxiliary storage device of the update setting management apparatus 30 or a storage device which is able to be connected to the update setting management apparatus 30 via the network.

The update setting storage unit 32 stores the updated display setting data. For example, in the fourth embodiment, a compilation result of the display setting data compiled by the user terminal 10 may be reflected (stored) in the update setting storage unit 32.

In response to an obtaining request for obtaining the display setting data from the image forming apparatus 20, the update setting management unit 31 transmits the display setting data stored in the update setting storage unit 32 to the image forming apparatus 20, which has requested the display setting data.

FIG. 18 is a sequence chart illustrating an example of a processing procedure of an automatic updating process of the displaying setting data according to the fourth embodiment.

When the display setting updating unit 227 detects an arrival of an update time of the display setting data in step S601, the display setting updating unit 227 transmits, to the update setting management unit 31 of the update setting management apparatus 30, the obtaining request for obtaining the display setting data in step S602.

Information (time information) which represents the update time of the display setting data, and information which represents a transmission destination of the obtaining request for obtaining the display setting data may be included, for example, in the display setting data.

FIG. 19 is a table illustrating a first example of the display setting data according to the fourth embodiment. The display setting data shown in FIG. 19 further includes the update time and a reference destination.

The update time is information which represents a point of time (timing) to update the display setting data. For example, the update time may be designated (set) by a yyyy-mm-dd-hh format, a nD format, a nH format, or the like. The yyyy-mm-dd-hh format is a format which represents a specific date and time. That is, in "yyyy-mm-dd-hh", "yyyy" represents a year (year of grace). Also, "mm" represents a month, "dd" represents a day, and "hh" represents an hour (time of day). The nD format is a format which represents the number of days of an update interval. That is, in "nD", "n" is an integer of 1 or more and "D" is an identifier representing that a unit of "n" is one day. The nH format is a format which represents a time of an update interval. That is, in "nH", "n" is an integer of 1 or more and "H" is an identifier representing that a unit of "n" is one hour.

The reference destination is identification information of an obtaining destination (source) of the display setting data. In other words, the display setting data is obtained from the obtaining destination. For example, a value of the reference destination may be a Uniform Resource Locator (URL).

In a case in which the display setting data includes a configuration shown in FIG. 19, the display setting updating unit 227 detects an arrival of the update time based on a value of the update time of the display setting data stored in the display setting storage unit 231. Further, the display setting updating unit 227 transmits, to a destination identified by the corresponding reference destination of the display setting data, the obtaining request for obtaining the display setting data. It should be noted that in a case in which a value of the update time is the nD format or the nH format, the last update date and time may be stored and passage of n days or H hours from the last update date and time may be detected.

Subsequently, the update setting management unit 31 obtains the display setting data from the update setting storage unit 32 to send (transmit) the obtained display setting data to the display setting updating unit 227 which is the transmission source of the obtaining request in step S603. It should be noted that the display setting data stored in the update setting storage unit 32 may be different from the display setting data updated at a previous time.

Subsequently, in response to receiving the display setting data, the display setting updating unit 227 overwrites the received display setting data in the display setting data stored in the display setting storage unit 231 in step S604. As a result, the display setting data stored in the display setting storage unit 231 is updated. It should be noted that the update time and/or the reference destination may be updated. In this way, in a case in which the update time is represented by the yyyy-mm-dd-hh format, the update setting management unit 31 can notify the display setting updating unit 227 of an update time of the next time. Further, in a case in which the update time is represented by the nD format or the nH format, an update interval (update cycle) for the next time can be changed.

It should be noted that detection of the arrival of the update time may be executed in accordance with step S101 shown in FIG. 3, FIG. 6, or FIG. 9. That is, before the display setting data is read, the display setting updating unit 227 may determine whether the update time arrives (whether the update time elapses). Then, the display setting updating unit 227 may execute a process in step S602 in a case in which the update time arrives.

Further, in a case in which the update time arrives after the display setting data has been read already in step S101, the display setting data stored in the display setting storage unit 231 may be updated, and display control based on the updated display setting data may be valid after the image forming apparatus 20 is started next time.

It should be noted that for each of the display settings, the update time and the reference destination may be different.

FIG. 20 is a table illustrating a second example of the display setting data according to the fourth embodiment. In the display setting data shown in FIG. 20, the update times and the reference destinations can be set individually for the respective display settings. In this case, in step S602 shown in FIG. 18, the display setting updating unit 227 transmits, to the update setting management unit 31 related to the reference destination set in the display setting in which the update time arrives, the obtaining request, including a setting name of the display setting in which the update time arrives, for obtaining display setting data. It should be noted that in FIG. 20, it is not required to perform update for the display settings in which the update time and the reference destination are not set.

Further, the display setting data may include a configuration in which the configuration shown in FIG. 19 and the configuration shown in FIG. 20 are combined.

FIG. 21 is a table illustrating a third example of the display setting data according to the fourth embodiment.

In the display setting data shown in FIG. 21, the common update time and the common reference destination valid in common for all the display settings can be set. Also, for the respective display settings, the individual update times and the individual reference destinations can be set individually. In FIG. 21, for the display settings in which the individual update time and the individual reference destination are not set, the common update time and the common reference destination are valid. On the other hand, for the display settings in which the individual update time and the individual reference destination are set, only the individual update time and the individual reference destination may be valid or both the individual update time and the individual reference destination, and the common update time and the common reference destination may be valid.

It should be noted that, to the display setting data shown in FIG. 10, the update times and the reference destinations may be added in a format shown in FIG. 19, FIG. 20, or FIG. 21.

Further, the update times and the reference destinations do not have to be included within the display setting data. Separately from the display setting data, the update times and the reference destinations may be managed in association with the display setting data or the respective display settings. Further, in a case in which the reference destination is fixed, the reference destination does not have to be used for a parameter of the display setting data.

As described above, according to the fourth embodiment, the display settings stored in the respective image forming apparatuses 20 can be updated automatically. In this way, for example, when the user updates the display setting data stored in the update setting storage unit 32, the updated display setting data can be reflected in the respective image forming apparatuses 20. In other words, for example, in a case in which the user updates (changes) a display setting of the display setting data stored in the update setting storage unit 32 of the update setting management apparatus 30, the updated display setting can become valid for one or more corresponding image forming apparatuses 20 by the corresponding image forming apparatuses 20 obtaining the updated display setting from the update setting management apparatus 30 at a time (point of time) represented by (set in) a display setting, before being updated, of the display setting data stored in the display setting storage unit 231. It should be noted that as shown in FIGS. 19 to 21, the display setting data may include the plurality of display settings (four display settings in FIGS. 19 to 21). In the respective display settings, the display contents (data items) to be displayed in the operation panel 25, the display conditions respectively corresponding to the display contents, the hiding conditions respectively corresponding to the display contents, the update times, and the reference destinations and the like are set. Then, when the display setting updating unit 227 detects arrivals of the respective update times (points of time) set in the display settings, the display setting updating unit 227 obtains display settings (update information items) updated by the user and stored in the update setting storage unit 32. Thereby, at least one of the display contents, the display conditions, the hiding conditions, and the like of the respective display settings, in which the update time arrives, can be updated. Further, the respective display settings are obtained from the update setting management apparatus(es) 30 represented by the reference destinations of the display settings in which the update time arrives.

It should be noted that the above described embodiments may be applied to one or more apparatuses other than the image forming apparatus 20. For example, the embodiments may be applied to display of information on an operation panel of a projector, a TV conference system, a digital camera or the like.

It should be noted that in the above described embodiments, the image forming apparatus 20, the operation panel 25, or the image forming apparatus 20 and the operation panel 25 is an example of an apparatus. The operation panel 25 is an example of a display unit. The display setting storage unit 231 is an example of a storage unit. The event reception unit 223 is an example of a determination unit. The message displaying unit 221 is an example of a display control unit. The display setting updating unit 227 is an example of an updating unit. The display setting data stored in the update setting storage unit 32 is an example of update information.

It should be noted that a person skilled in the field of information processing technology may employ the present invention using application specific integrated circuits (ASIC) or an apparatus in which circuit modules are connected.

Further, each of the functions (units) may be implemented by one or more circuits.

It should be noted that, in this specification, the circuit may include a processor programed by software to execute the corresponding functions and hardware which is designed to execute the corresponding functions such as the ASIC and the circuit module.

Further, the present invention is not limited to these embodiments, but various variations and modifications may be made without departing from the scope of the present invention.

The present application is based on and claims the benefit of priority of Japanese Priority Application No. 2015-099239 filed on May 14, 2015, with the Japanese Patent Office, the entire contents of which are hereby incorporated by reference.

REFERENCE SIGNS LIST 10 user terminal
11 display setting obtaining unit
12 remote compilation unit
13 display setting transmission unit
20 image forming apparatus
21 controller
22 scanner
23 printer
24 modem
25 operation panel
26 network interface
27 SD card slot
30 update setting management apparatus
31 update setting management unit
32 update setting storage unit
80 SD card
100 drive device
101 recording medium
102 auxiliary storage device
103 memory device
104 CPU
105 interface device
106 display device
107 input device
211 CPU
212 RAM
213 ROM
214 HDD
215 NVRAM
221 message displaying unit
222 message generation unit
223 event reception unit
224 main body system unit
225 display setting compilation unit
226 display setting management unit
227 display setting updating unit
231 display setting storage unit
B bus

The invention claimed is:

1. An apparatus comprising:
a display configured to display data;
a memory configured to store a plurality of display settings including a plurality of data items and a plurality of display conditions, respectively corresponding to the plurality of data items, the plurality of data items including the data, and the plurality of display conditions including a display condition for displaying the data; and
a processor that is coupled to the memory and that is configured to
determine whether the display condition is satisfied in accordance with a change of status of the apparatus;
display the data in the display in response to determining that the display condition is satisfied; and
obtain, via a network at a timing represented by information that is stored in association with the data, update information corresponding to at least one of the data and the display condition related to the data, and to update the at least one of the data and the display condition stored in the memory based on the update information,
wherein the update information obtained via the network includes information indicative of a next update time, and
wherein the processor obtains, based on the next update time, next update information via the network,
wherein, among the plurality of display settings, display settings for which individual update times are set are updated by the processor via the network based on the individual update times, and
wherein, among the plurality of display settings, display settings for which individual update times are not set but a common update time is set are updated by the processor via the network based on the common update time.

2. The apparatus according to claim 1, wherein the processor is configured to obtain the update information from a source represented by the information that is stored in association with the data.

3. The apparatus according to claim 1,
wherein the processor is configured to obtain, at respective timings represented by information items stored in association with the plurality of data items, update information items corresponding to at least one of the plurality of data items and the plurality of display conditions related to the plurality of data items.

4. The apparatus according to claim 1,
wherein the memory is configured to store a hiding condition for hiding the data being displayed in the display,
wherein the processor is configured to determine whether the display condition or the hiding condition is satisfied in accordance with the change of the status of the apparatus, and
wherein the processor is configured to hide the data being displayed in the display in response to determining that the hiding condition is satisfied.

5. The apparatus according to claim 1, wherein the change of the status of the apparatus includes at least one of displaying a predetermined screen in the display, starting a job executed by the apparatus, finishing a job executed by the apparatus, and changing a remaining amount of a consumable used by the apparatus.

6. The apparatus according to claim 1,
wherein the next update time is a date and time, and
wherein the processor obtains the next update information at the date and time.

7. The apparatus according to claim 1,
wherein the next update time is a time period, and
wherein the processor obtains the next update information upon an elapse of the time period.

8. The apparatus according to claim 1,
wherein the update information obtained via the network further includes information indicative of a source, and
wherein the processor obtains the next update information via the network from the source.

9. An information processing method executed by an apparatus including a display in which data is to be displayed, the apparatus being coupled to a memory configured to store a plurality of display settings including a plurality of data items and a plurality of display conditions, respectively corresponding to the plurality of data items, the plurality of data items including the data, and the plurality of display conditions including a display condition for displaying the data, the information processing method comprising:

determining, with reference to the memory, whether the display condition is satisfied in accordance with a change of status of the apparatus;
displaying the data in the display in response to determining that the display condition is satisfied; and
obtaining, via a network at a timing represented by info nation that is stored in association with the data, update information corresponding to at least one of the data and the display condition related to the data, and updating the at least one of the data and the display condition stored in the memory based on the update information, the update information obtained via the network including information indicative of a next update time; and
obtaining, based on the next update time, next update information via the network,
wherein, among the plurality of display settings, display settings for which individual update times are set are updated by the processor via the network based on the individual update times, and
wherein, among the plurality of display settings, display settings for which individual update times are not set but a common update time is set are updated by the processor via the network based on the common update time.

10. The information processing method according to claim 9, wherein, the update information is obtained from a source represented by the information that is stored in association with the data.

11. The information processing method according to claim 9,
wherein, at respective timings represented by information items stored in association with the plurality of data items, update information items corresponding to at least one of the plurality of data items and the plurality of display conditions related to the plurality of data items are obtained.

12. The information processing method according to claim 9,
wherein the memory is configured to store a hiding condition for hiding the data being displayed in the display,
wherein, it is determined that whether the display condition or the hiding condition is satisfied in accordance with the change of the status of the apparatus, and
wherein, the data being displayed in the display is hidden in response to determining that the hiding condition is satisfied.

13. The information processing method according to claim 9, wherein the change of the status of the apparatus includes at least one of displaying a predetermined screen in the display, starting a job executed by the apparatus, finishing a job executed by the apparatus, and changing a remaining amount of a consumable used by the apparatus.

14. An image forming apparatus coupled to an update setting management apparatus via a network, the image forming apparatus comprising:
a memory configured to store a plurality of display settings including a plurality of data items and a plurality of display conditions, respectively corresponding to the plurality of data items, the plurality of data items including data, and the plurality of display conditions including a display condition for displaying the data, the plurality of data items including messages, differing depending on status of the image forming apparatus, for a user;
a display configured to display the data; and
a processor that is coupled to the memory and that is configured to
determine whether the display condition is satisfied in accordance with a change of the status of the image forming apparatus;
display the data in the display in response to determining that the display condition is satisfied; and
obtain, via the network at a timing represented by information that is stored in association with the data, update information, input in advance in the update setting management apparatus, corresponding to at least one of the data and the display condition related to the data, and to update the at least one of the data and the display condition stored in the memory based on the update information,
wherein the update information obtained via the network includes information indicative of a next update time, and
wherein the processor obtains, based on the next update time, next update information via the network,
wherein, among the plurality of display settings, display settings for which individual update times are set are updated by the processor via the network based on the individual update times, and
wherein, among the plurality of display settings, display settings for which individual update times are not set but a common update time is set are updated by the processor via the network based on the common update time.

15. The image forming apparatus according to claim 14, wherein the processor is configured to obtain the update information from a source represented by the information that is stored in association with the data.

16. The image forming apparatus according to claim 14, wherein the processor is configured to obtain, at respective timings represented by information items stored in association with the plurality of data items, update information items corresponding to at least one of the plurality of data items and the plurality of display conditions related to the plurality of data items.

17. The image forming apparatus according to claim 14,
wherein the memory is configured to store a hiding condition for hiding the data being displayed in the display,
wherein the processor is configured to determine whether the display condition or the hiding condition is satisfied in accordance with the change of the status of the image forming apparatus, and
wherein the processor is configured to hide the data being displayed in the display in response to determining that the hiding condition is satisfied.

18. The image fondling apparatus according to claim 14, wherein the change of the status of the image forming apparatus includes at least one of displaying a predetermined screen in the display, starting a job executed by the image forming apparatus, finishing a job executed by the image forming apparatus, and changing a remaining amount of a consumable used by the image forming apparatus.

* * * * *